United States Patent
Mori et al.

(10) Patent No.: US 10,118,121 B2
(45) Date of Patent: Nov. 6, 2018

(54) PLUGGED HONEYCOMB STRUCTURE AND PLUGGED HONEYCOMB SEGMENT

(71) Applicant: NGK INSULATORS, LTD., Nagoya (JP)

(72) Inventors: Kazuya Mori, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 127 days.

(21) Appl. No.: 15/248,168

(22) Filed: Aug. 26, 2016

(65) Prior Publication Data

US 2017/0056805 A1    Mar. 2, 2017

(30) Foreign Application Priority Data

Sep. 2, 2015 (JP) .................. 2015-172708

(51) Int. Cl.
*B01D 50/00* (2006.01)
*B01D 46/24* (2006.01)

(52) U.S. Cl.
CPC ....... *B01D 46/2455* (2013.01); *B01D 46/247* (2013.01); *B01D 46/2459* (2013.01); *B01D 46/2466* (2013.01); *B01D 46/2474* (2013.01); *B01D 2046/2481* (2013.01); *B01D 2046/2485* (2013.01); *B01D 2046/2492* (2013.01)

(58) Field of Classification Search
None
See application file for complete search history.

(56) References Cited

U.S. PATENT DOCUMENTS

| 6,669,751 | B1* | 12/2003 | Ohno | B01D 39/2075 |
| | | | | 55/385.3 |
| 7,435,279 | B2* | 10/2008 | Masukawa | C04B 35/565 |
| | | | | 55/523 |
| 7,892,308 | B2* | 2/2011 | Mizutani | B01D 46/2459 |
| | | | | 422/169 |
| 9,073,289 | B2* | 7/2015 | Tamai | B32B 3/12 |
| 9,080,484 | B2 | 7/2015 | Miyair | |
| 9,238,190 | B2* | 1/2016 | Aoki | B01D 46/244 |
| D763,427 | S | 8/2016 | Miyairi | |
| 9,586,195 | B2* | 3/2017 | Hayashi | C04B 35/195 |

(Continued)

FOREIGN PATENT DOCUMENTS

JP    2014-200741 A1    10/2014
JP    2015-029939 A1    2/2015

*Primary Examiner* — Amber R Orlando
(74) *Attorney, Agent, or Firm* — Burr & Brown, PLLC

(57) ABSTRACT

A plugged honeycomb structure includes: a plurality of honeycomb segments, a bonding layer, and plugging portions to plug open ends of cells of the honeycomb segments. The honeycomb segment is configured so that the cells having at least two kinds of different shapes are disposed in a cross section orthogonal to an extension direction of the cells, the honeycomb segment has a center region configured by repeating units to maintain a repeated pattern including cell arrangement in which inflow cells surround an inflow cell, and a circumferential region located at the circumference of the center region, the circumferential region has open frontal area that is larger than open frontal area of the center region at the inflow end face of the honeycomb segment, the segment circumferential wall and the bonding layer have a special range of a thickness.

8 Claims, 14 Drawing Sheets

(56) References Cited

U.S. PATENT DOCUMENTS

| | | | | |
|---|---|---|---|---|
| 2004/0097370 A1* | 5/2004 | Ichikawa | ........... | B01D 46/0001 |
| | | | | 502/439 |
| 2004/0137194 A1* | 7/2004 | Fukao | ................... | B01D 53/885 |
| | | | | 428/116 |
| 2004/0142145 A1* | 7/2004 | Hashimoto | ........ | B01D 39/2068 |
| | | | | 428/116 |
| 2004/0258582 A1* | 12/2004 | Miwa | ..................... | B01D 45/16 |
| | | | | 422/177 |
| 2006/0240212 A1* | 10/2006 | Masukawa | ......... | B01D 46/2448 |
| | | | | 428/58 |
| 2007/0128405 A1* | 6/2007 | Sakaguchi | ......... | B01D 46/0001 |
| | | | | 428/116 |
| 2007/0231533 A1* | 10/2007 | Aniolek | ............. | B01D 46/0063 |
| | | | | 428/116 |
| 2007/0294989 A1* | 12/2007 | Ichikawa | ............. | B01D 46/247 |
| | | | | 55/523 |
| 2009/0269548 A1* | 10/2009 | Mizutani | .............. | B01D 46/247 |
| | | | | 428/117 |
| 2010/0205918 A1* | 8/2010 | Dietzhausen | ...... | B01D 46/2455 |
| | | | | 55/419 |
| 2010/0269697 A1* | 10/2010 | Vincent | ................ | B01D 46/247 |
| | | | | 95/273 |
| 2011/0230335 A1* | 9/2011 | Yamada | ............... | B01D 46/247 |
| | | | | 502/100 |
| 2014/0298779 A1 | 10/2014 | Miyairi | | |
| 2015/0037532 A1 | 2/2015 | Shibata et al. | | |

* cited by examiner

PLUGGED HONEYCOMB STRUCTURE AND PLUGGED HONEYCOMB SEGMENT

The present application is an application based on JP2015-172708 filed on Feb. 9, 2015 with the Japan Patent Office, the entire contents of which are incorporated herein by reference.

BACKGROUND OF THE INVENTION

Field of the Invention

The present invention relates to a plugged honeycomb structure and a plugged honeycomb segment. More particularly the present invention relates to a plugged honeycomb structure and a plugged honeycomb segment capable of improving a continuous regeneration performance of a filter to trap a particulate matter when they are used as the filter and so preventing a segregation of a particulate matter in the filter.

Description of the Related Art

In recent years, there has been a demand for the reduction in a fuel consumption of an automobile from the viewpoints of influences on the global environment and resource saving. This leads to a tendency of using internal combustion engines with a good thermal efficiency, such as a direct injection type gasoline engine and a diesel engine, as a power source for an automobile.

Meanwhile, these internal combustion engines have a problem that a soot is generated during a combustion of the fuel. A countermeasure has been then required from the viewpoint of an air environment to remove toxic components included in an exhaust gas and to avoid the emission of a particulate matter (hereinafter this may be called "a PM"), such as a soot or an ash, to the air.

Especially there is a global tendency of tightening the regulations on a removal of the PM emitted from a diesel engine. Then a honeycomb-structured wall flow type exhaust gas purification filter has attracted the attention as a trapping filter (this may be called a "DPF") to remove the PM, and various systems for the filter have been proposed. Such a DPF is typically configured so that a plurality of cells serving as a through channel of a fluid is defined by a porous partition wall, and by plugging the cells alternately, the porous partition wall making up the cells functions as a filter. A pillar-shaped structure including a plurality of cells defined by a porous partition wall may be called a "honeycomb structure". Then a honeycomb structure including cells whose open ends are plugged with plugging portions may be called a "plugged honeycomb structure". A plugged honeycomb structure is widely used as a trapping filter, such as a DPF. As an exhaust gas containing a particulate matter flows into the plugged honeycomb structure from the inflow end face (first end face) of the plugged honeycomb structure, the particulate matter in the exhaust gas is filtered when the exhaust gas passes through the partition wall, and the purified gas is emitted from the outflow end face (second end face) of the plugged honeycomb structure.

Conventionally a plugged honeycomb structure includes the cells, such as quadrangular cells, hexagonal cells, and HAC cells (cells having the geometry that is the combination of octagons and quadrangles). Recently new plugged honeycomb structures which include the combination of cells of different shapes or devise the position of plugging have been developed (see Patent Documents 1 and 2). Such plugged honeycomb structures allow a pressure loss at the initial stage of use to be reduced, and allow a pressure loss when a PM is accumulated to be reduced, and then allow cracks during burning of the PM to be suppressed and a lot of ash at the partition wall to be accumulated.

[Patent Document 1] JP-A-2014-200741
[Patent Document 2] JP-A-2015-029939

SUMMARY OF THE INVENTION

When a plugged honeycomb structure having a special shape of cells as shown in Patent Documents 1 and 2 is provided as a DPF in an internal combustion engine of an automobile or the like, such a plugged honeycomb structure typically is manufactured to have a round pillar shape of a certain size. The following manufacturing method is proposed as one of the methods to manufacture a round pillar-shaped plugged honeycomb structure. Firstly, a plurality of honeycomb segments, which has partition walls to form special cells (having a special shape) and a segment circumferential wall to surround the circumference of the special cells, is prepared. Next, the plurality of honeycomb segments are bonded with a bonding material to prepare a bonded member of the honeycomb segments (hereinafter called a "honeycomb-segment bonded member"). Next, the circumference of the honeycomb-segment bonded member is ground into an arbitrary shape, and then the circumference is subjected to a coating treatment to manufacture a plugged honeycomb structure. Hereinafter a plugged honeycomb structure manufactured by such a method may be called a "plugged honeycomb structure having a segmented structure".

Such a plugged honeycomb structure having a segmented structure may be used as a trapping filter to purify an exhaust gas emitted from a gasoline engine (typically a direct injection type gasoline engine). Note here that the temperature of an exhaust gas emitted from gasoline engines is typically higher than the temperature of an exhaust gas emitted from diesel engines. Therefore it is important for a trapping filter to purify an exhaust gas emitted from a gasoline engine to have a continuous regeneration performance so as to burn the collected the PM while the filter is collecting the PM. Less an exhaust gas flows through the circumferential part of each of the honeycomb segments of a plugged honeycomb structure having a segmented structure, which means that the amount of the PM trapped at the circumferential part becomes less than that at the center part. However, since less an exhaust gas at high temperatures also flows at the circumferential part of each of the honeycomb segments, the continuous regeneration performance as described above deteriorates, and more PM tends to be accumulated at the circumferential part of each of the honeycomb segments by purifying an exhaust-gas for a long time. If the PM is accumulated excessively at the circumferential part only, the excessively accumulated PM is burnt suddenly and the honeycomb segment may break in some cases.

In view of such problems of the conventional techniques, the present invention provides a plugged honeycomb structure capable of improving a continuous regeneration performance of a filter to trap a particulate matter when it is used as the filter and so preventing a segregation of a particulate matter in the filter, and such a plugged honeycomb segment.

As a result of further investigations to solve the aforementioned problems, the present inventors obtained the following findings. It was found that, in a honeycomb segment having a specific cell arrangement, devising a shape of the honeycomb segment on the side of the circumference allows the continuous regeneration performance of the plugged honeycomb structure to be improved. That is, an open frontal area in the circumferential region of the honeycomb segment is made larger than an open frontal area in the center region without changing the cell shape of each of the honeycomb segments itself. It was found that, with this configuration, a continuous regeneration performance of the plugged honeycomb structure can be improved, and a segregation of a particulate matter in the filter can be suppressed. The present invention provides the following plugged honeycomb structure and plugged honeycomb segment.

According to a first aspect of the present invention, a plugged honeycomb structure is provided, comprising:

a plurality of prismatic-columnar shaped honeycomb segments, each having porous partition walls that define a plurality of cells extending from an inflow end face to which a fluid flows to an outflow end face from which a fluid flows, and a segment circumferential wall disposed at an outermost circumference of each of the honeycomb segments;

a bonding layer to bond the side surfaces of the plurality of honeycomb segments; and plugging portions disposed in open ends of predetermined cells in the inflow end face of each of the honeycomb segments and in open ends of residual cells in the outflow end face of each of the honeycomb segments, wherein each of the honeycomb segments is configured so that the cells having at least two kinds of different shapes are disposed in a cross section orthogonal to an extension direction of the cells, each of the honeycomb segments has a center region including a center of the cross section orthogonal to the extension direction of the cells and a circumferential region located in the side of the circumference of the center region, each of the honeycomb segments has a repeated pattern including cell arrangement in which inflow cells in which the plugging portions are disposed in open ends of the cells in the outflow end face surround one outflow cell in which the plugging portions are disposed in open ends of the cell in the inflow end face, and a range including repeating units to maintain the repeated pattern is the center region, in the inflow end face of at least one of the honeycomb segments, the circumferential region is configured to have an open frontal area that is larger than an open frontal area of the center region, a thickness of the segment circumferential wall of each of the honeycomb segments is from 0.3 to 1.0 mm, and a thickness of the bonding layer is from 0.5 to 1.5 mm.

According to a second aspect of the present invention, the plugged honeycomb structure according to above first aspect is provided, wherein the repeated pattern includes the cells having at least two kinds of different shapes.

According to a third aspect of the present invention, the plugged honeycomb structure according to above first or second aspects is provided, wherein center region cells disposed in the center region include two kinds or more of the cells that are different in shape of the cross section.

According to a fourth aspect of the present invention, the plugged honeycomb structure according to any one of above first to third aspects is provided, wherein a value obtained by subtracting a value of an open frontal area in the center region from a value of an open frontal area in the circumferential region is 10% or more.

According to a fifth aspect of the present invention, a plugged honeycomb segment is provided, comprising:

a prismatic-columnar shaped honeycomb segment having porous partition walls that define a plurality of cells extending from an inflow end face to which a fluid flows to an outflow end face from which a fluid flows, and a segment circumferential wall disposed at an outermost circumference of each of the honeycomb segments; and plugging portions disposed in open ends of predetermined cells in the inflow end face of each of the honeycomb segments and in open ends of residual cells in the outflow end face of each of the honeycomb segments, wherein each of the honeycomb segments is configured so that the cells having at least two kinds of different shapes are disposed in a cross section orthogonal to an extension direction of the cells, each of the honeycomb segments has a center region including a center of the cross section orthogonal to the extension direction of the cells and a circumferential region located in the side of the circumference of the center region, each of the honeycomb segments has a repeated pattern including cell arrangement in which inflow cells in which the plugging portions are disposed in open ends of the cells in the outflow end face surround one outflow cell in which the plugging portions are disposed in open ends of the cell in the inflow end face, and a range including repeating units to maintain the repeated pattern is the center region, in the inflow end face of the honeycomb segment, the circumferential region is configured to have an open frontal area that is larger than an open frontal area of the center region, and a thickness of the segment circumferential wall of each of the honeycomb segments is from 0.3 to 1.0 mm.

According to a sixth aspect of the present invention, the plugged honeycomb segment according to above fifth aspect is provided, wherein the repeated pattern includes the cells having at least two kinds of different shapes.

According to a seventh aspect of the present invention, the plugged honeycomb segment according to above fifth or sixth aspects is provided, wherein center region cells disposed in the center region include two kinds or more of the cells that are different in shape of the cross section.

According to an eighth aspect of the present invention, the plugged honeycomb segment according to any one of above fifth to seventh aspects is provided, wherein a value obtained by subtracting a value of an open frontal area in the center region from a value of an open frontal area in the circumferential region is 10% or more.

A plugged honeycomb structure of the present invention is a so-called plugged honeycomb structure having a segmented structure, in which the center region of the honeycomb segment includes the range configured by repeating units to maintain a repeated pattern including a specific cell arrangement. In the plugged honeycomb structure of the present invention, in the inflow end face of the honeycomb segment, the circumferential region is configured to have an open frontal area that is larger than an open frontal area of the center region. In the plugged honeycomb structure of the present invention, a thickness of the segment circumferential wall of each of the honeycomb segments is from 0.3 to 1.0 mm, and a thickness of the bonding layer is from 0.5 to 1.5 mm. The thus configured plugged honeycomb structure can improve a continuous regeneration performance of a filter to trap a particulate matter when it is used as the filter and prevent a segregation of a particulate matter in the filter.

A plugged honeycomb segment of the present invention is to manufacture a plugged honeycomb structure of the present invention. A plurality of the plugged honeycomb segments of the present invention is used and the side surfaces of the plurality of honeycomb segments are bonded to each other via bonding layer, whereby a plugged honeycomb structure of the present invention can be manufactured very simply.

DESCRIPTION OF THE PREFERRED EMBODIMENTS

Figure 1:
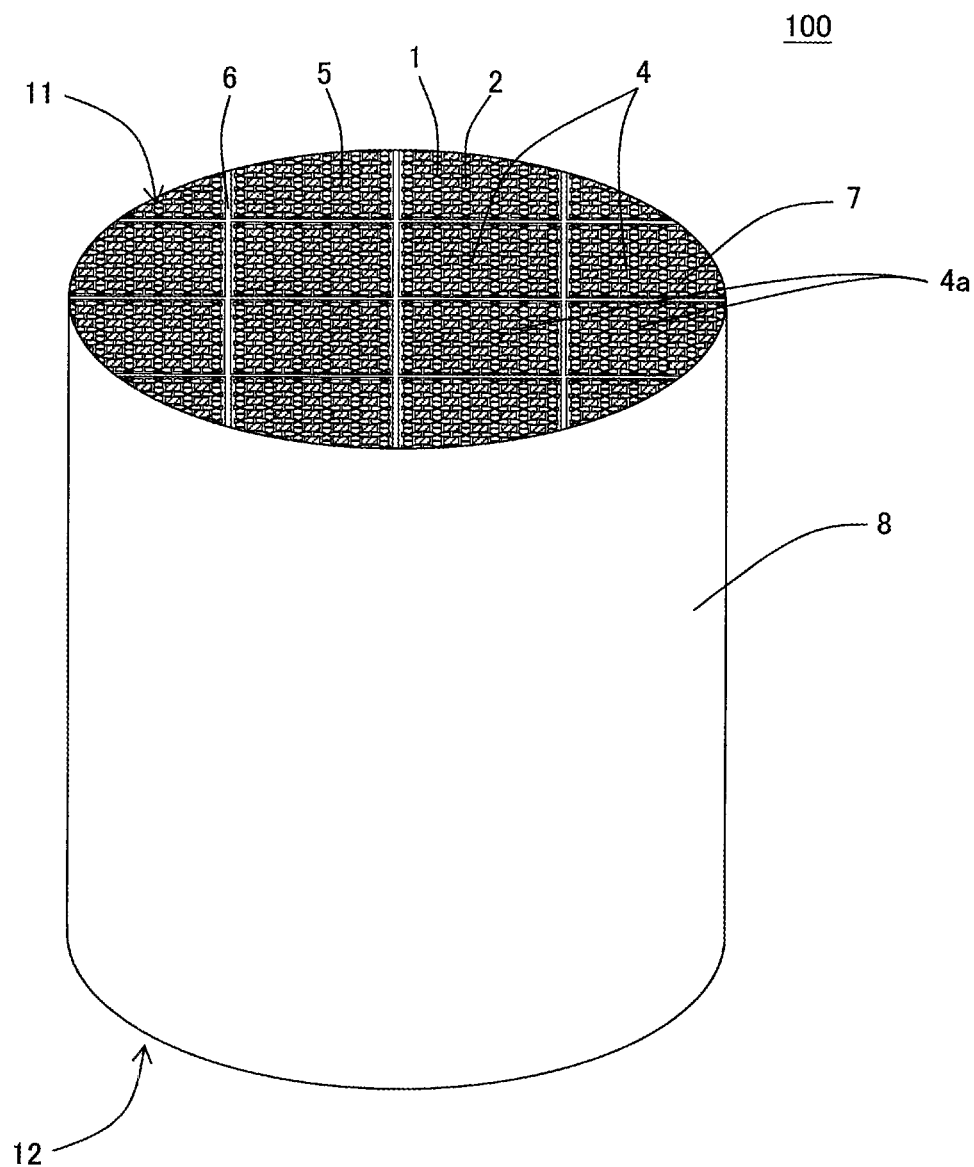
FIG. 1 is a schematic perspective view showing the first embodiment of a plugged honeycomb structure according to the present invention when viewed from its inflow-side end face.

Hereinafter, embodiments of the present invention will be described. The present invention is not limited to the embodiments below, and the embodiments below can be, of course, appropriately modified and improved based on the general knowledge of the person skilled in the art without departing from the spirit of the present invention. Then, these modifications and improvements are also included in the scope of the present invention.

(1) Plugged Honeycomb Structure:

As shown in FIGS. 1 through 5, a plugged honeycomb structure of the first embodiment of the present invention is a plugged honeycomb structure 100 that includes a plurality of honeycomb segments 4, a bonding layer 6, and plugging portions 5. That is, the plugged honeycomb structure 100 according to the present embodiment is a so-called plugged honeycomb structure having a segmented structure. The plugged honeycomb structure 100 further includes an outer wall 8 in the circumference so as to surround the plurality of honeycomb segments 4.

Figure 2:
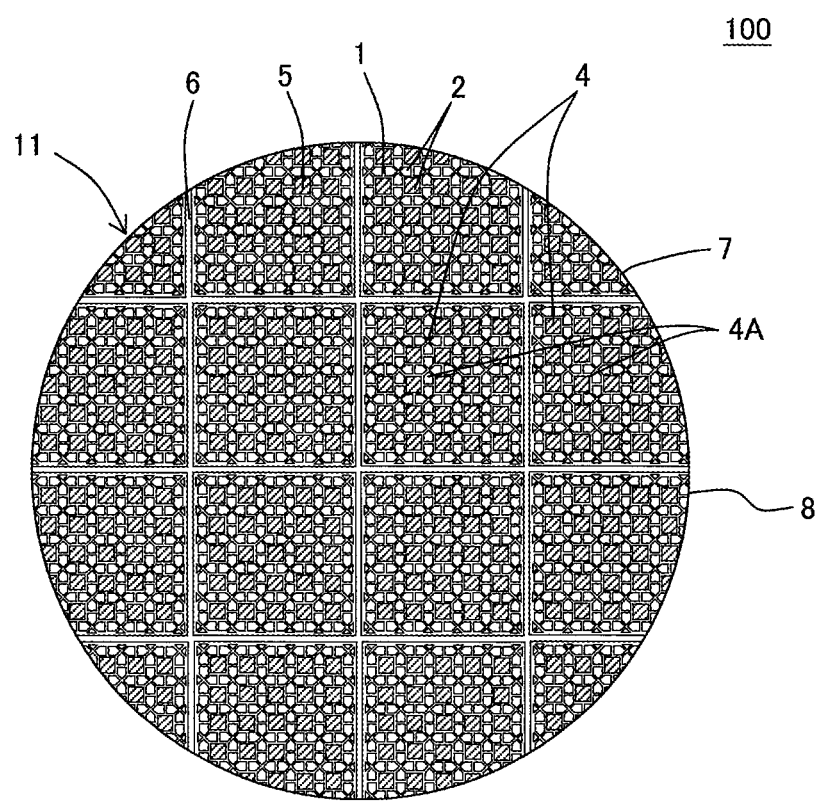
FIG. 2 is a schematic plan view showing the first embodiment of the plugged honeycomb structure according to the present invention when viewed from its inflow-side end face.
Figure 3:
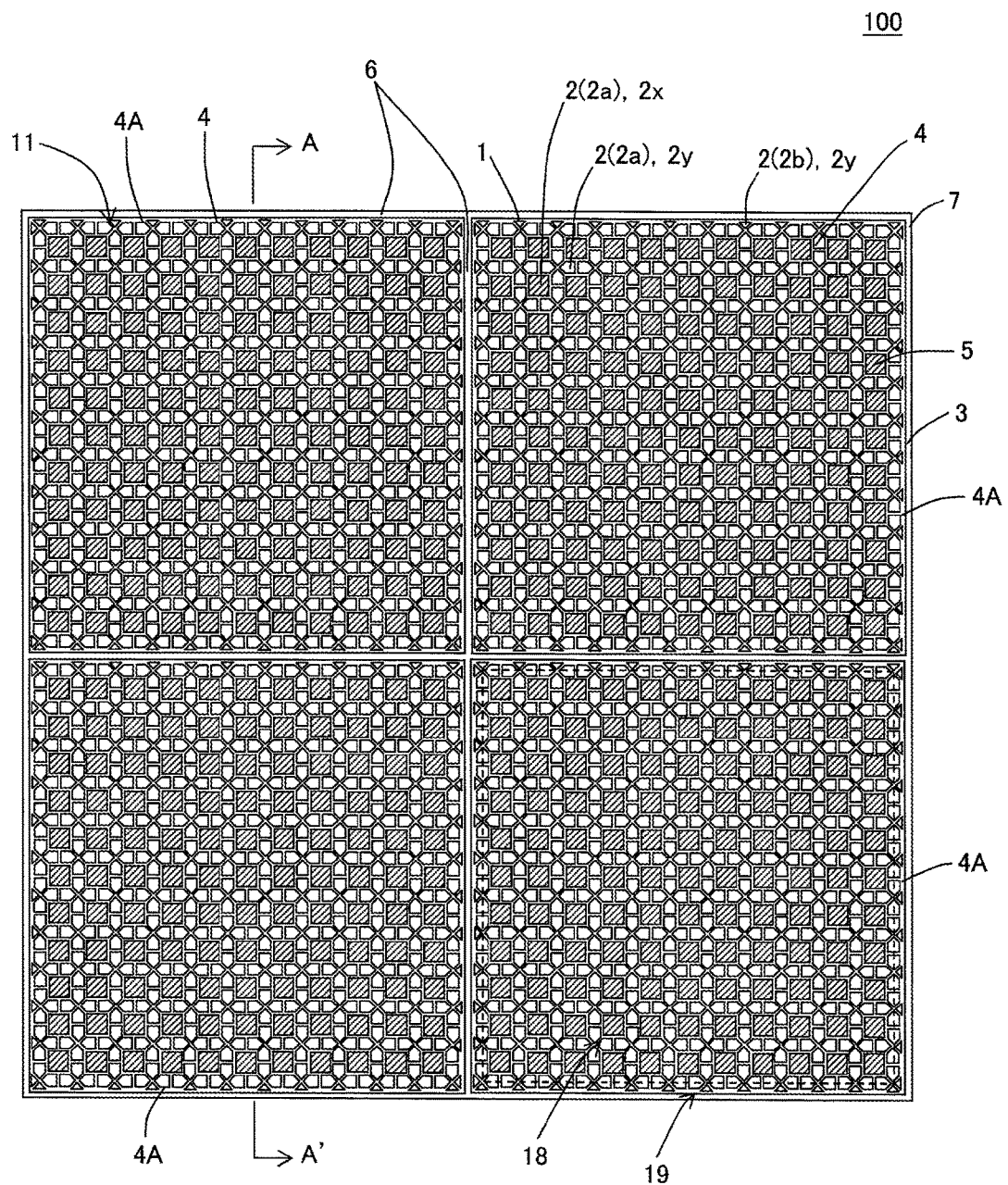
FIG. 3 is an enlarged plan view of a part of the inflow end face of the plugged honeycomb structure shown in FIG. 2.
Figure 4:
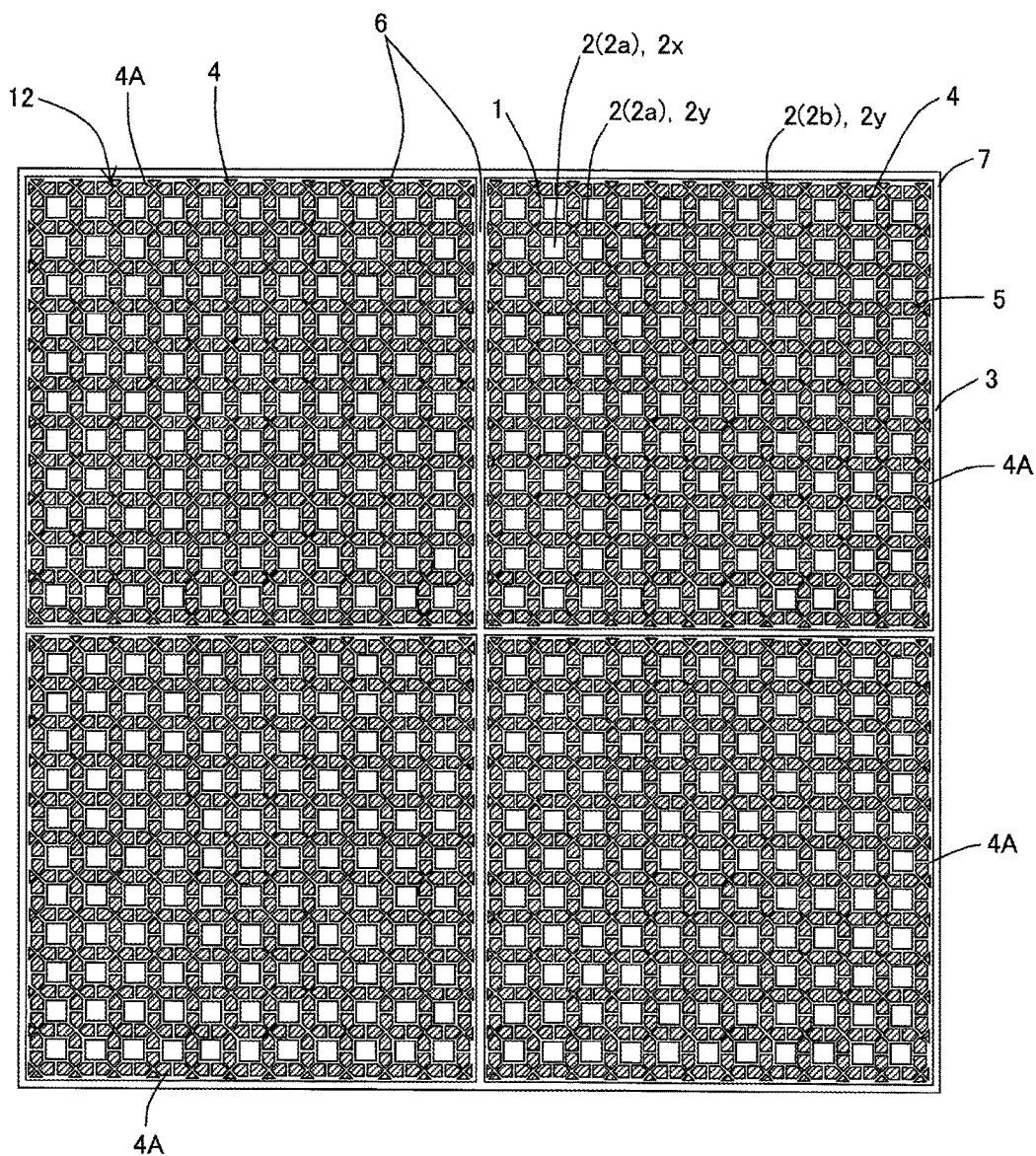
FIG. 4 is an enlarged plan view of a part of the outflow end face of the plugged honeycomb structure shown in FIG. 2.
Figure 5:
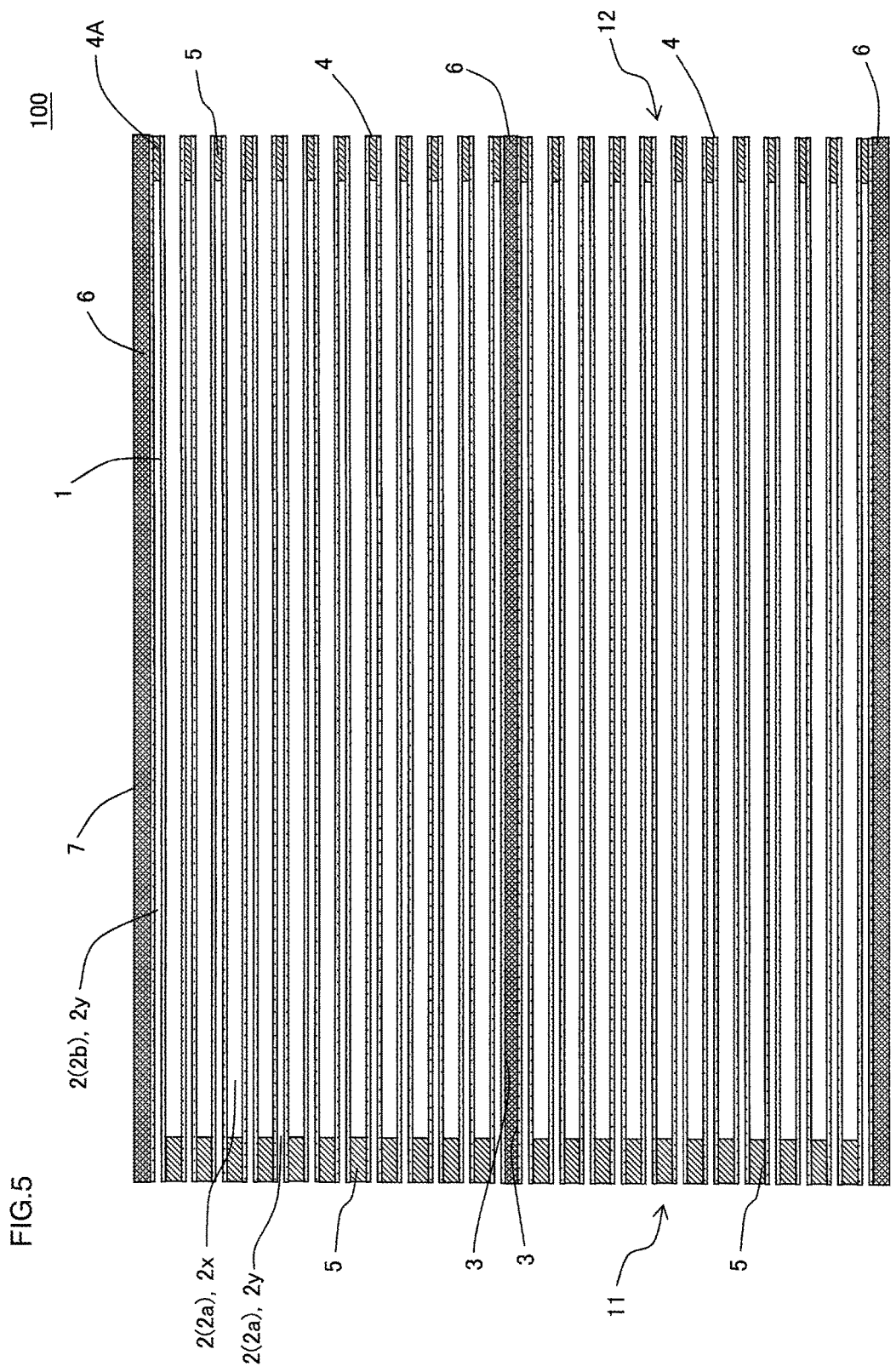
FIG. 5 is a schematic cross-sectional view taken along the line A-A' of FIG. 3.
Figure 6:
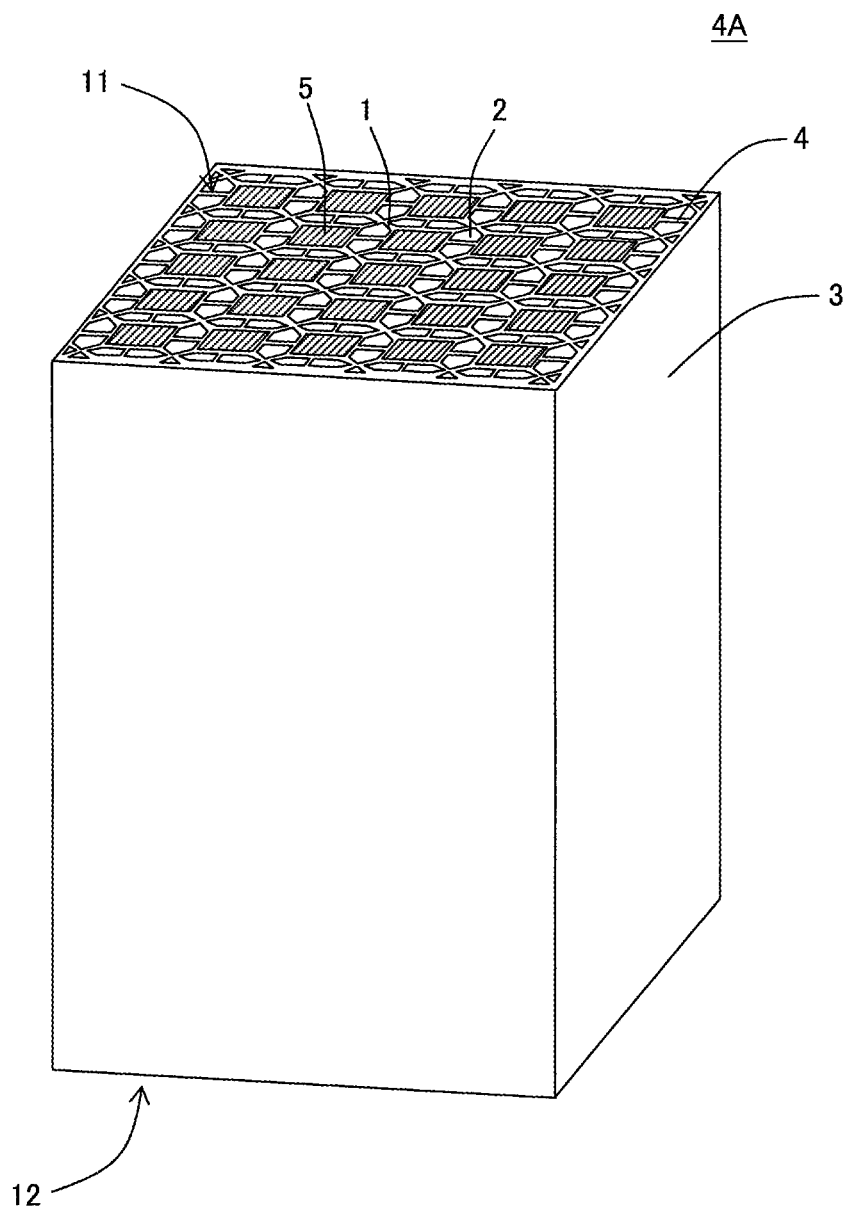
FIG. 6 is a schematic perspective view showing a plugged honeycomb segment included in the plugged honeycomb structure shown in FIG. 1 when viewed from the inflow-side end face.
Figure 7:
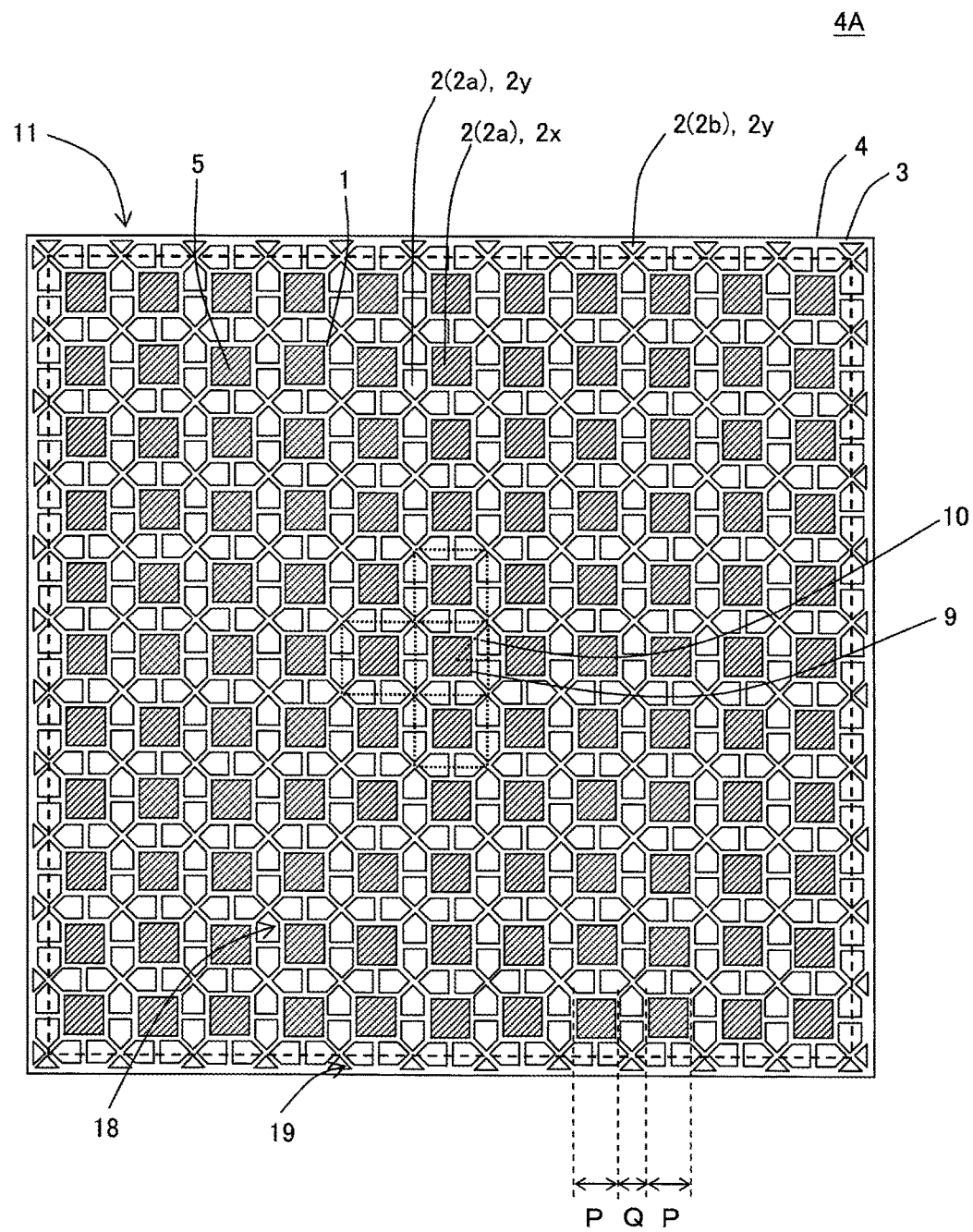
FIG. 7 is a schematic plan view showing the plugged honeycomb segment included in the plugged honeycomb structure shown in FIG. 1 when viewed from the inflow-side end face.
Figure 8:
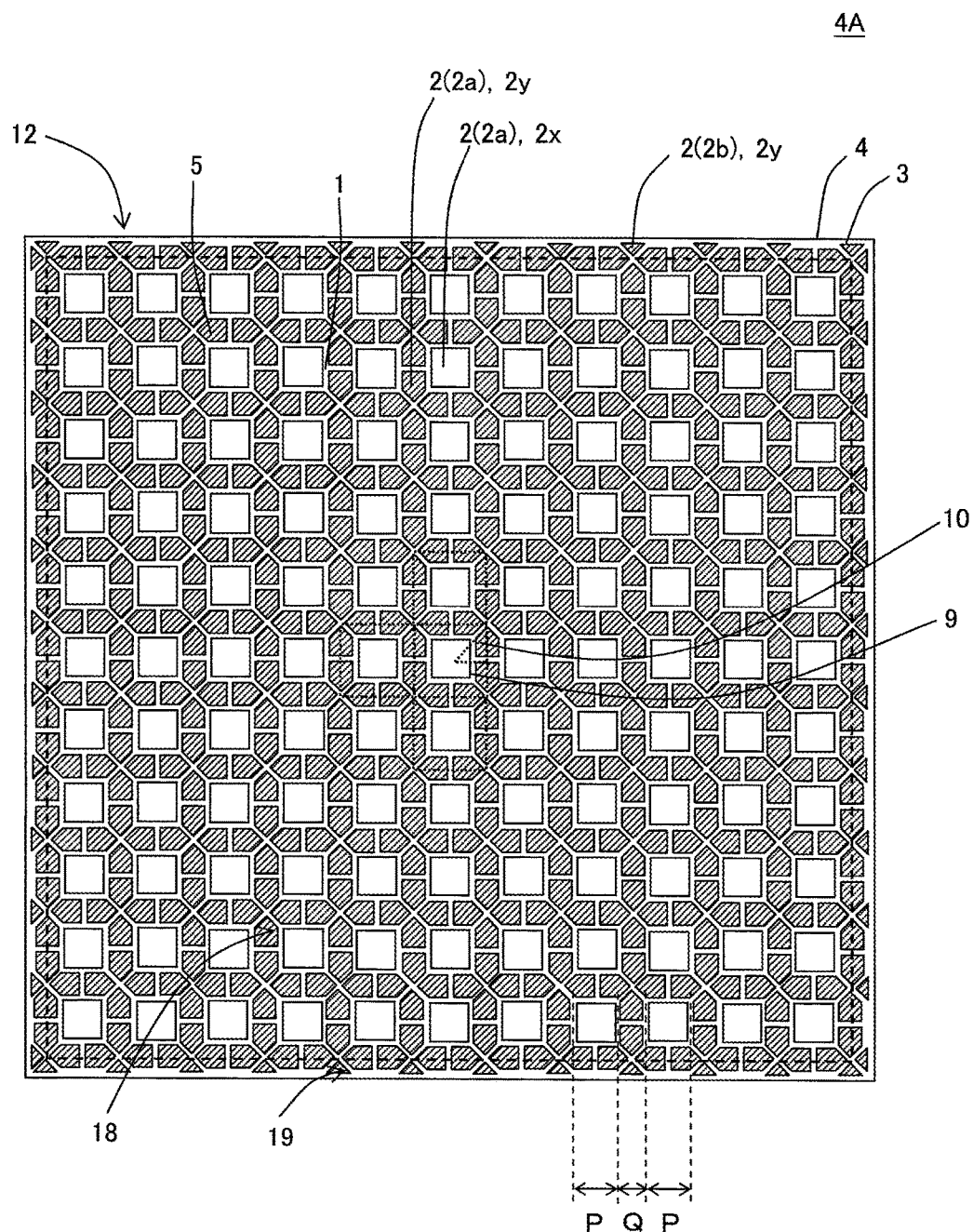
FIG. 8 is a schematic plan view showing the plugged honeycomb segment included in the plugged honeycomb structure shown in FIG. 1 when viewed from the outflow-side end face.

Herein, FIG. 1 is a schematic perspective view showing the first embodiment of a plugged honeycomb structure according to the present invention when viewed from its inflow-side end face. FIG. 2 is a schematic plan view showing the first embodiment of the plugged honeycomb structure according to the present invention when viewed from its inflow-side end face. FIG. 3 is an enlarged plan view of a part of the inflow end face of the plugged honeycomb structure shown in FIG. 2. FIG. 4 is an enlarged plan view of a part of the outflow end face of the plugged honeycomb structure shown in FIG. 2. FIG. 5 is a schematic cross-sectional view taken along the line A-A' of FIG. 3. Furthermore, FIG. 6 is a schematic perspective view showing a plugged honeycomb segment included in the plugged honeycomb structure shown in FIG. 1 when viewed from the inflow-side end face. FIG. 7 is a schematic plan view showing the plugged honeycomb segment included in the plugged honeycomb structure shown in FIG. 1 when viewed from the inflow-side end face. FIG. 8 is a schematic plan view showing the plugged honeycomb segment included in the plugged honeycomb structure shown in FIG. 1 when viewed from the outflow-side end face.

As shown in FIGS. 6 through 8, a honeycomb segment 4 includes porous partition walls 1 that define a plurality of cells 2 extending from an inflow end face 11 into which a fluid flows to an outflow end face 12 from which a fluid flows, and a segment circumferential wall 3 disposed at the outermost circumference. As shown in FIGS. 1 through 5, the plugged honeycomb structure 100 of the present embodiment includes a plurality of the honeycomb segments 4, and the side surfaces of the plurality of honeycomb segments 4 are bonded to each other via the bonding layer 6. In the plugged honeycomb structure 100 of the present embodiment, honeycomb segments 4 among the plurality of honeycomb segments 4 that are disposed in a center part and are not in contact with the outer wall 8 have a prismatic columnar shape, where the direction from the inflow end face 11 to the outflow end face 12 is the axial direction. Honeycomb segments 4 among the plurality of honeycomb segments 4 that are disposed in the circumferential part in contact with the outer wall 8 are formed into a pillar shape, in which a part of the honeycomb segment 4 which is formed into a prismatic columnar shape is ground to follow the shape of the outer wall 8.

The bonding layer 6 is prepared by a bonding material to bond the side surfaces of the plurality of honeycomb segments 4 to each other. A bonded member obtained by bonding the plurality of honeycomb segments 4 via the bonding layer 6 may be called a honeycomb-segment bonded member 7.

The plugging portions 5 are disposed in the open ends of the cells 2 formed in each of the honeycomb segments 4, and they plug either one of the open end on the side of the inflow end face 11 and the open end on the side of the outflow end face 12. That is, the plugging portions 5 are disposed in the open ends of predetermined cells 2x in the inflow end face 11 of each of the honeycomb segments 4 and in the open ends of residual cells 2y other than the predetermined cells 2x in the outflow end face 12 of each of the honeycomb segments. Hereinafter a cell 2 with the plugging portions 5 disposed in the open end thereof on the inflow end face 11 of each of the honeycomb segments 4 (i.e., the predetermined cell 2x as described above) may be called an "outflow cell 2x". Then a cell 2 with the plugging portions 5 disposed in the open end thereof on the outflow end face 12 of each of the honeycomb segments 4 (i.e., the residual cell 2y as described above) may be called an "inflow cell 2y". A honeycomb segment 4 with the plugging portions 5 disposed in the open ends of the cells 2 may be called a plugged honeycomb segment 4A.

The honeycomb segment 4 is configured so that cells having at least two kinds of different shapes are formed in a cross section orthogonal to the extension direction of the cells 2. For example, the honeycomb segment 4 shown in FIGS. 6 through 8 includes cells 2 of two kinds of different shapes, whose shape of cell is a quadrangular shape (e.g., outflow cells 2x) and a pentagonal shape (e.g., inflow cells 2y). Hereinafter the shape of the cells 2 in a cross section orthogonal to the extension direction of the cells 2 may be called a "cell shape", a "cross-sectional shape" and a "shape of a cross section".

In the plugged honeycomb structure 100 of the present embodiment, a thickness of the segment circumferential wall 3 of each of the honeycomb segments 4 is from 0.3 to 1.0 mm, and a thickness of the bonding layer 6 from 0.5 to 1.5 mm.

The honeycomb segment 4 has a center region 18 including a center of the cross section orthogonal to the extension direction of the cells 2 and a circumferential region 19 positioned in the side of the circumference of the center region 18. In FIGS. 7 and 8, the center region 18 of the honeycomb segment 4 is inside the region surrounded by the dotted line (i.e., the region indicated with reference numeral 18). The circumferential region 19 of the honeycomb segment 4 is outside the region surrounded by the dotted line (i.e., the region indicated with reference numeral 19). Furthermore, the cells 2 formed in the center region 18 may be called center region cells 2a. The cells 2 formed in the circumferential region 19 may be called circumferential region cells 2b.

Figure 9:
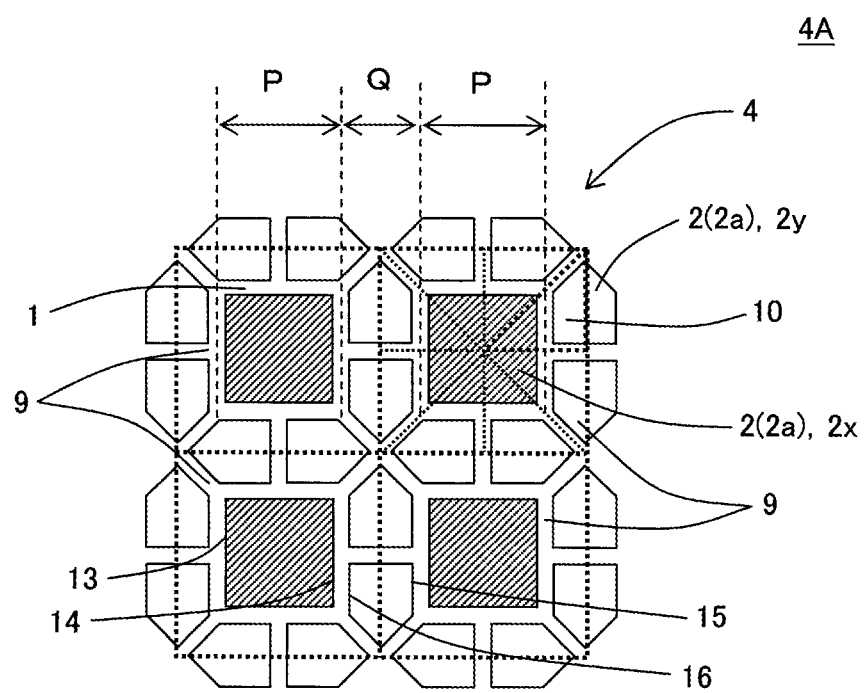
FIG. 9 is a schematic partially enlarged view showing the first embodiment of the plugged honeycomb structure according to the present invention when viewed from the inflow-side end face.

The honeycomb segment 4 has a repeated pattern 9 including a cell arrangement in which inflow cells 2y surround one outflow cell 2x in the inflow end face 11. Then, the range including repeating units 10 to maintain this repeated pattern 9 is the center region 18 as described above. Then the circumferential region 19 is outside the center region 18, which does not have "repeating units 10 to maintain this repeated pattern 9" as described above. The "repeated pattern 9" is a pattern configured by a part or all of the inflow cells 2y which surrounds one outflow cell 2x positioned at the center, where two or more of the substantially the same patterns are present in the inflow end face 11 of the honeycomb segment 4. For example, in the honeycomb segment 4 shown in FIGS. 6 through 8, the plugging portions 5 are disposed so that inflow cells 2y that a shape of cells 2 is a pentagonal shape surround an outflow cell 2x that a shape of cells 2 is a quadrangular shape. With this configuration, the center region 18 has a cell arrangement such that the inflow cells 2y surround the outflow cell 2x. Then, the "repeated pattern 9" in the honeycomb segment 4 shown in FIGS. 6 through 8 is the range configured by one outflow cell 2x and a half of each of the eight inflow cells 2y, i.e., the "quadrangle surrounded by the dotted line" indicated with reference numeral 9 of FIGS. 6 through 8. The "repeating units 10 to maintain the repeated pattern 9" refers to the minimum repeating unit when the "repeated pattern 9" further includes repeating units. That is, as shown in FIG. 9, repeating units ("triangles surrounded by the dotted line" indicated with reference numeral 10 of FIG. 9) are present in the "repeated pattern 9", which are eight equal parts obtained by dividing the repeated pattern 9 so as to draw virtual lines radially from the center of the repeated pattern 9. Such triangular repeating units 10 are the repeating units 10 to maintain the repeated pattern 9. The repeating units 10 refer to the units actually forming a part of the repeated pattern 9. Therefore, even if a unit of the same shape as that of the repeating unit 10 does not form a part of the repeated pattern 9, such a unit is not the "repeating unit 10 to maintain the repeated pattern 9".

The "inflow cells 2y surround an outflow cell 2x" means the following configuration in a cross section orthogonal to the extension direction of the cells 2. The following describes an example where the cell shape of the outflow cells 2x is a quadrangular shape as shown in FIGS. 6 through 8. Firstly one side of an inflow cell 2y is arranged to be adjacent to each of the four sides of one outflow cell 2x. In this case, one side of each of two or more inflow cells 2y may be arranged to be adjacent to one side of one outflow cell 2x. That is, one side of one of the inflow cells 2y may be arranged to be adjacent to one side of the one outflow cell 2x at the position of a half of the one side, and then one side of another inflow cell 2y may be arranged to be adjacent to the one side of the one outflow cell 2x at the position of the remaining half of the one side. Then all of the inflow cells 2y adjacent to the one outflow cell 2x are disposed so that these inflow cells 2y are adjacent to each other at their mutual one sides. The geometry of the inflow cells 2y in such a state refers to the "inflow cells 2y surround an outflow cell 2x".

In the plugged honeycomb structure 100 of the present embodiment, at least one honeycomb segment 4 (specifically a plugged honeycomb segment 4A) is configured as follows. In the inflow end face 11 of the honeycomb segment 4, the circumferential region 19 is configured to have an open frontal area that is larger than an open frontal area of the center region 18. The plugged honeycomb structure 100 of the present embodiment can be preferably used as a trapping filter to remove a particulate matter included in an exhaust gas. Then, the thus configured plugged honeycomb structure can improve a continuous regeneration performance and so can prevent a segregation of a particulate matter in the filter. That is, the plugged honeycomb structure 100 of the present embodiment allows an exhaust gas to flow through the circumferential part of the honeycomb segment easily even when a lot of PM is accumulated at the circumferential part of the honeycomb segment. Therefore, the PM is trapped and it can be excellently burnt at the same time. Especially in a conventional plugged honeycomb structure having a segmented structure, the "arrangement of cells (in other words, continuity of the repeating units of cells)" among the honeycomb segments of a honeycomb-segment bonded member has not been seen as a problem especially. Then, it has been considered that, in a conventional plugged honeycomb structure having a segmented structure, the center part and the circumferential part of a honeycomb segment preferably have the same degree of an open frontal area, and it does not have the configuration where the open frontal area in the circumferential part is made larger intentionally. Hereinafter a honeycomb segment configured so that, in the inflow end face 11 of the honeycomb segment 4, the circumferential region 19 has an open frontal area that is larger than an open frontal area of the center region 18 may be called a "specific honeycomb segment".

As shown in FIGS. 6 through 8, the inflow cells 2y formed in the honeycomb segment 4 have an apparent cross-sectional shape orthogonal to the center axial direction of the inflow cells 2y that is a substantially pentagon. Then, the outflow cells 2x formed in the honeycomb segment 4 have an apparent cross-sectional shape orthogonal to the center axial direction of the outflow cells 2x that is a substantially square. Herein, the "cross-sectional shape" refers to a shape appearing in the cross section when the cells 2 are cut along a plane orthogonal to the center axial direction, and refers to the shape of a part surrounded with the partition wall 1 defining the cells 2. The honeycomb segment 4 shown in FIGS. 6 through 8 is configured so that the outflow cells 2x having a substantially square cross-sectional shape have a relatively larger cross-sectional area than that of the inflow cells 2y having a substantially pentagonal cross-sectional shape. In the circumferential region 19 of the plugged honeycomb segment 4A, it is configured that the existing ratio of the outflow cells 2x, which have a relatively large cross-sectional area, is high. Then the plugged honeycomb segment 4A is configured so that, in the inflow end face 11, the circumferential region 19 has open frontal area that is larger than open frontal area of the center region 18.

As shown in FIGS. 1 through 5, when the plugged honeycomb structure 100 includes a plurality of honeycomb segments 4, it includes honeycomb segments 4 disposed in a center part that is not in contact with the outer wall 8 and honeycomb segments 4 that are in contact with the outer wall 8. Hereinafter, the honeycomb segments 4 disposed in a center part that is not in contact with the outer wall 8 are called center segments, and the honeycomb segments 4 that are in contact with the outer wall 8 are called circumferential segments. In the plugged honeycomb structure 100 of the present embodiment, at least one center segment is preferably a specific honeycomb segment, and all of the center segments are specific honeycomb segments more preferably. As described above, in a specific honeycomb segment, a thickness of the segment circumferential wall 3 of the honeycomb segment is from 0.3 to 1.0 mm. The plugged honeycomb structures 100 shown in FIGS. 1 through 5 show examples where all of the center segments are specific honeycomb segments.

The honeycomb segment 4 is preferably configured so that a predetermined repeated pattern includes cells 2 having at least two kinds of different shapes. The cell arrangements of the honeycomb segment 4 shown in FIGS. 6 through 8 include a predetermined repeated pattern.

In the present specification, the open frontal area in the center region 18 can be obtained by the following method. Firstly, the area of the center region 18 in the inflow end face 11 of the honeycomb segment 4 is obtained. The center region 18 has the following repeated pattern. The repeated pattern includes cell arrangement in which inflow cells 2y surround one outflow cell 2x. Then the center region 18 is the range configured by the repeating units to maintain the repeated pattern as described above. The area of the center region 18 can be obtained by a known method, such as an image analysis. Herein the area of the center region 18 includes the area of the partition wall 1, the area of the plugging portions 5 disposed in the open ends of the outflow cells 2x and the area of the open ends of the inflow cells 2y (open end area) existing in the center region 18 of the inflow end face 11. Next, the open end area of the inflow cells 2y formed in the center region 18 of the inflow end face 11 is obtained. The open end area of the inflow cells 2y formed in the center region 18 of the inflow end face 11 can be obtained by a known method, such as an image analysis. Then, the percentage of the value obtained by dividing the open end area S1 of the inflow cells 2y formed in the center region 18 of the inflow end face 11 by the area S2 of the center region 18 (S1/S2×100) is the open frontal area of the center region 18.

In the present specification, the open frontal area in the circumferential region 19 can be obtained by the following method. Firstly, the area of the circumferential region 19 in the inflow end face 11 of the honeycomb segment 4 is obtained. The circumferential region 19 is outside the center region 18, which does not include the repeating units 10 to maintain the repeated pattern 9. The area of the circumferential region 19 can be obtained by a known method, such as an image analysis. Herein the area of the circumferential region 19 can be referred to the area obtained by subtracting the area of the center region 18 from the overall area of the inflow end face 11 of the honeycomb segment 4. Next, the open end area of the inflow cells 2y formed in the circumferential region 19 of the inflow end face 11 is obtained. The open end area of the inflow cells 2y formed in the circumferential region 19 of the inflow end face 11 can be obtained by a known method, such as an image analysis. Then, the percentage of the value obtained by dividing the open end area S3 of the inflow cells 2y formed in the circumferential region 19 of the inflow end face 11 by the area S4 of the circumferential region 19 (S3/S4×100) is the open frontal area of the circumferential region 19.

The value obtained by subtracting the value of the open frontal area in the center region (the value of percentage) from the value of the open frontal area in the circumferential region (the value of percentage) is preferably 10% or more, more preferably 15% or more and further preferably 20% or more. Although the upper limit of the value obtained by subtracting the value of the open frontal area in the center region from the value of the open frontal area in the circumferential region is not limited especially, the upper limit may be 40%, for example. If the value obtained by subtracting the value of the open frontal area in the center region from the value of the open frontal area in the circumferential region is less than 10%, a difference between the open frontal area in the circumferential region and the open frontal area in the center region becomes small, which may lead to the difficulty to obtain a sufficient improvement of the continuous regeneration performance.

The overall shape of the plugged honeycomb structure 100 is not limited especially. For example, the overall shape of the plugged honeycomb structure 100 shown in FIG. 1 is a round-pillar shape where the shape of the inflow end face 11 and the outflow end face 12 are circular. Although an overall shape is not shown, the overall shape of the plugged honeycomb structure may be a pillar shape, where the shape of the inflow end face and the outflow end face are substantially circular in shape, including an ellipse, a race-track shape, or an oval. Alternatively, the overall shape of the plugged honeycomb structure may be a polygonal prismatic columnar shape, where the shape of the inflow end face and the outflow end face are a quadrangle, a hexagon or the like.

The material of the honeycomb segments is not limited especially, and main components preferably include various kinds of ceramics, such as oxides and non-oxides, and metals from the viewpoints of strength, heat resistance, durability and the like. Specifically, examples of the ceramics include cordierite, mullite, alumina, spinel, silicon carbide, silicon nitride, and aluminum titanate. Examples of the metals include Fe—Cr—Al based metals and metal silicon. A main component preferably includes one kind or two kinds or more selected from these materials. Particularly, a main component preferably includes one kind or two kinds or more selected from the group consisting of alumina, mullite, aluminum titanate, cordierite, silicon carbide, and silicon nitride from the viewpoints of high strength and high heat resistance. Silicon carbide or silicon-silicon carbide composite materials are particularly suitable from the viewpoints of high heat conductivity and high heat resistance. Herein, the "main component" means a component included in 50 mass % or more of the honeycomb segments, more preferably 70 mass % or more and further preferably 80 mass % or more.

The material of the plugging portions is not limited especially. The material of the plugging portions preferably includes one kind or two kinds or more selected from the various kinds of ceramics and metals described above for the suitable materials of the honeycomb segment.

The plugged honeycomb structure of the present embodiment includes a plurality of honeycomb segments (specifically plugged honeycomb segments) that are bonded to each other via the bonding layer. Such a configuration allows a thermal stress applied to the plugged honeycomb structure to be distributed, and cracks due to local temperature rise to be prevented effectively.

The size and the shape of the honeycomb segments are not limited especially. Note here that if the size of one honeycomb segment is too large, a sufficient effect of preventing cracks, which is an advantageous effect of the segment structure, may not be obtained. If the size of one honeycomb segment is too small, the bonding of the honeycomb segments with the bonding layer may be complicated.

The shape of the honeycomb segments is not limited especially. For example, examples of the shape of the honeycomb segments include a polygonal prismatic columnar shape, where the cross-sectional shape orthogonal to the axial direction of the honeycomb segment is a quadrangle, a hexagon or the like. Honeycomb segments disposed at the outermost circumference of the plugged honeycomb structure may have a prismatic columnar shape, a part of which is processed by grinding or the like in accordance with the overall shape of the plugged honeycomb structure.

Each of the honeycomb segments 4 in the plugged honeycomb structure 100 of the present embodiment has a repeated pattern including cell arrangement such that eight inflow cells 2y having a substantially pentagonal cross-sectional shape surround one outflow cell 2x having a substantially square cross-sectional shape. By this configuration, the plugged honeycomb structure 100 of the present embodiment can make a filtration area of each honeycomb segment 4 larger than the conventional plugged honeycomb structures when they are used as a filter. Therefore a pressure loss can be reduced after the PM is accumulated. Further, in the thus configured honeycomb segment 4, the outflow cells 2x are not adjacent to each other, and the outflow cells 2x are surrounded entirely with the inflow cells 2y. This can increase the open frontal area of the outflow cells 2x, and can decrease the number of the outflow cells 2x compared with the number of the inflow cells 2y, so that the pressure loss during the initial stage of the operation of the plugged honeycomb structure 100 can be reduced.

Furthermore, as shown in FIGS. 1 through 5, the inflow cells 2y having a substantially pentagonal cross-sectional shape are not a regular pentagon in shape, but preferably have a so-called home plate shape, for example, whose inner angles are 90°, 135°, 90°, 90°, and 135° that are clockwise from one vertex. By this configuration, four inflow cells 2y are formed adjacent to each other so that corner portions at the side of the tip ends of the home plate shapes are collected. In the four inflow cells 2y where corner portions at their tip ends of the home plate shapes are collected, two partition walls 1 are mutually composed perpendicularly. Therefore, a heat capacity at the partition walls 1 at the part of the collected corner portions can be kept high, and so a thermal stress can be absorbed when a PM is burnt.

As shown in FIG. 9, the distance P between the partition wall 1 defining a first side 13 of an outflow cell 2x and the partition wall 1 defining a second side 14 opposed to the first side 13 of the outflow cell 2x is preferably in the range of exceeding 0.8 mm and less than 2.4 mm. Herein, the distance P refers to the shortest distance connecting the center in the thickness direction of the partition wall 1 defining the first side 13 and the center in the thickness direction of the partition wall 1 defining the second side 14 opposed thereto. Furthermore, as shown in FIG. 9, the distance Q refers to the distance between the partition wall 1 defining a third side 15 of the inflow cell 2y that is adjacent substantially parallel to one side of the outflow cell 2x and the partition wall 1 defining a fourth side 16 opposed to the third side 15 of the inflow cell 2y. Then the ratio of the distance Q to the distance P is preferably in the range of exceeding 0.4 and less than 1.1. Herein, the distance Q refers to the shortest distance connecting the center in the thickness direction of the partition wall 1 defining the third side 15 and the center in the thickness direction of the partition wall 1 defining the fourth side 16 opposed thereto. The relationship between the distance P and the distance Q in the above range is preferable because it allows a pressure loss to be reduced while having a good balance during the initial stage and after the PM accumulation to be reduced while having good balance. FIG. 9 is a schematic partially enlarged view of the plugged honeycomb structure that is the first embodiment of the present invention when viewed from the side of the inflow end face of the plugged honeycomb structure.

A thickness of the segment circumferential wall of each of the honeycomb segments is preferably from 0.3 to 1.0 mm, more preferably from 0.3 to 0.8 mm, and particularly preferably from 0.4 to 0.6 mm. If the thickness of the segment circumferential wall of each of the honeycomb segments is less than 0.3 mm, it is not desirable that the strength of the honeycomb segments deteriorates. If the thickness of the segment circumferential wall of each of the honeycomb segments exceeds 1.0 mm, it is not desirable that a pressure loss increases.

A thickness of the bonding layer is preferably from 0.5 to 1.5 mm, more preferably from 0.7 to 1.3 mm, and particularly preferably from 0.8 to 1.2 mm. If the thickness of the bonding layer is less than 0.5 mm, it is not desirable that the PM accumulation limit may deteriorate. If the thickness of the bonding layer exceeds 1.5 mm, it is not desirable that a pressure loss may increase.

Furthermore, in the plugged honeycomb structure of the present embodiment, the cells formed in the center region (center region cells 2a) preferably include two kinds or more of cells that are different in cross-sectional shape. In the plugged honeycomb structure 100 shown in FIGS. 1 through 5, the outflow cells 2x having a substantially square cross-sectional shape are the center region cells 2a having a first cross-sectional shape, and the inflow cells 2y having a substantially pentagonal cross-sectional shape are the center region cells 2a having a second cross-sectional shape. By this configuration, the cells having at least two kinds or more of cross-sectional shapes preferably form a predetermined repeated pattern. When the cells have a polygonal cross-sectional shape, the corner portions of the polygon may have a curved shape having R. For example, a substantial square is the inclusive term of a square cross-sectional shape and a square cross-sectional shape having at least one corner portion that is a curved shape having R. Similarly a substantial pentagon is the inclusive term of a pentagonal cross-sectional shape and a pentagonal cross-sectional shape having at least one corner portion that is a curved shape having R.

A thickness of the partition wall 1 is not limited especially. For example, the thickness of the partition wall 1 that is present between one side of one of the cells 2 and one side of another cell 2 adjacent substantially parallel to the one cell 2 is preferably from 0.07 to 0.51 mm, more preferably from 0.10 to 0.46 mm and particularly preferably from 0.12 to 0.38 mm. If the thickness of the partition wall 1 is smaller than 0.07 mm, it is not desirable that this might cause the difficulty to form the honeycomb segments 4. If the thickness of the partition wall 1 is larger than 0.51 mm, this is not desirable from the viewpoints of acquiring enough filtration area and reducing a pressure loss.

In the plugged honeycomb structure of the present embodiment, one of the suitable examples includes each of the honeycomb segments having the following configuration. In the inflow cells 2y, a geometrical surface area GSA is preferably from 10 to 30 $cm^2/cm^3$, and more preferably from 12 to 18 $cm^2/cm^3$. The "geometrical surface area GSA" as described above refers to a value (S/V) obtained by dividing the overall inner surface area (S) of the inflow cells 2y by the total volume (V) of the honeycomb segment. Since a larger filtration area of a filter typically leads to a decrease in a thickness of a PM accumulated at the partition wall, falling within such a numerical range of the geometrical surface area GSA allow the pressure loss of the plugged honeycomb structure to be low. Therefore, if the geometrical surface area GSA of the inflow cells 2y is smaller than 10 $cm^2/cm^3$, it is not desirable that this might cause an increase in a pressure loss during a PM accumulation. If it is larger than 30 $cm^2/cm^3$, it is not desirable that this might cause the pressure loss at the initial stage to increase.

In the plugged honeycomb structure of the present embodiment, a cell open frontal area of the inflow cells 2y is preferably from 20 to 70%, and more preferably from 25 to 65%. If the cell open frontal area of the inflow cells 2y is smaller than 20%, it is not desirable that this might cause the pressure loss at the initial stage to increase. If it is larger than 70%, it is not desirable that this might cause the filtration rate to increase, which leads to a deterioration in a trapping efficiency of a PM, and further the strength of the partition wall 1 may deteriorate. The "cell cross-sectional open frontal area of the inflow cells 2y" refers to the ratio of "the total cross-sectional area of the inflow cells 2y" to the sum of "the cross-sectional area of the entire partition wall 1 formed in the plugged honeycomb structure" and "the total cross-sectional area of all of the cells 2" in a cross section perpendicular to the center axial direction of the plugged honeycomb structure.

In the plugged honeycomb structure of the present embodiment, a hydraulic diameter of each of the plurality of cells 2 is preferably from 0.5 to 2.5 mm, and more preferably from 0.8 to 2.2 mm. If the hydraulic diameter of each of the plurality of cells 2 is smaller than 0.5 mm, it is not desirable that this may cause the initial pressure loss to increase. If the hydraulic diameter of each of the plurality of cells 2 is larger than 2.5 mm, it is not desirable that this may cause a contact area of an exhaust gas with the partition wall 1 to decrease, and the purification efficiency may deteriorate. Herein, the hydraulic diameter of each of the plurality of cells 2 refers to a value calculated by "4×(cross-sectional area)/(circumferential length)" based on the cross-sectional area and the circumferential length of each cell 2. The cross-sectional area of the cell 2 refers to the area of the shape of cell (cross-sectional shape) appearing in a cross section perpendicular to the center axial direction of the plugged honeycomb structure, and the circumferential length of the cell refers to the length of the circumference of the cross-sectional shape of the cell (length of a closed line surrounding the cross section).

Considering the trade-off among the initial pressure loss, the pressure loss during a PM accumulation and the trapping efficiency, the plugged honeycomb structure of the present embodiment preferably satisfies the following configurations at the same time. That is, a geometrical surface area GSA of the inflow cells 2y is from 10 to 30 $cm^2/cm^3$, a cell open frontal area of the inflow cells 2y is from 20 to 70%, and a hydraulic diameter of each of the plurality of cells 2 is from 0.5 to 2.5 mm, which are preferably satisfied at the same time. Furthermore, the followings are more preferably satisfied at the same time, i.e., a geometrical surface area GSA of the inflow cells 2y is from 12 to 18 $cm^2/cm^3$, a cell open frontal area of the inflow cells 2y is from 25 to 65%, and a hydraulic diameter of each of the plurality of cells 2 is from 0.8 to 2.2 mm.

In the plugged honeycomb structure of the present embodiment, a catalyst may be loaded onto the partition wall 1 defining the plurality of cells 2. Loading a catalyst onto the partition wall 1 means that the surface of the partition wall 1 and the inner wall of pores formed at the partition wall 1 are coated with the catalyst. Examples of the kinds of catalyst include an SCR catalyst (zeolite, titania, vanadium), at least two kinds of noble metals of Pt, Rh, and Pd, and three-way catalyst containing at least one kind of alumina, ceria, and zirconia. Loading such a catalyst onto the partition wall enables a detoxication of NOx, CO, HC and the like contained in an exhaust gas emitted from a direct injection type gasoline engine and a diesel engine, for example, and facilitates a combustion of the PM accumulated at the surface of the partition wall 1 for removal due to the catalyst action.

The method for loading of such catalyst in the plugged honeycomb structure of the present embodiment is not limited especially, and a method typically performed by a person skilled in the art can be used. Specifically, the method for loading of a catalyst includes a method that a catalyst slurry may be wash-coated, be dried and fired, for example.

Figure 10:
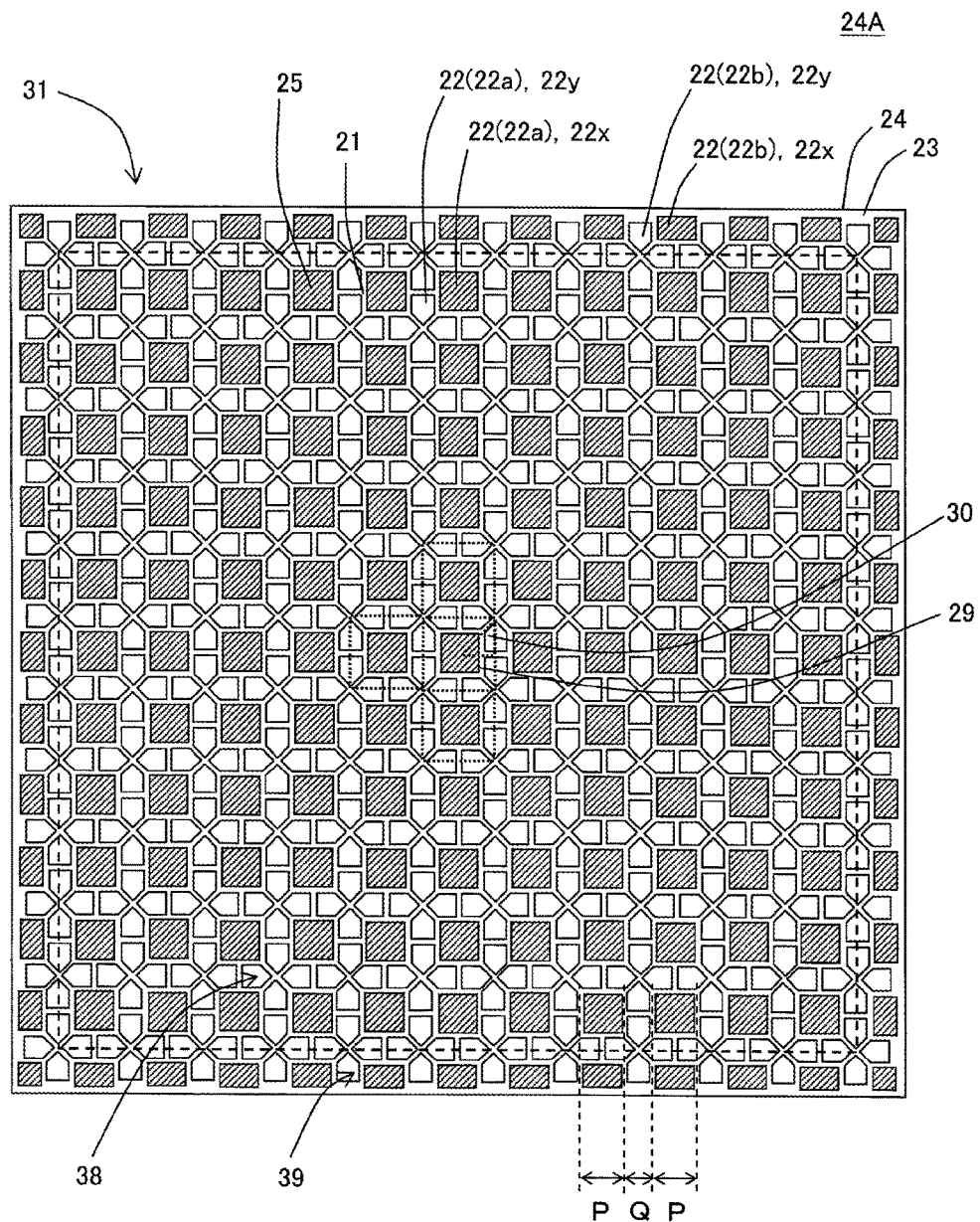
FIG. 10 is a schematic plan view showing a plugged honeycomb segment included in the second embodiment of a plugged honeycomb structure according to the present invention when viewed from the inflow-side end face.
Figure 11:
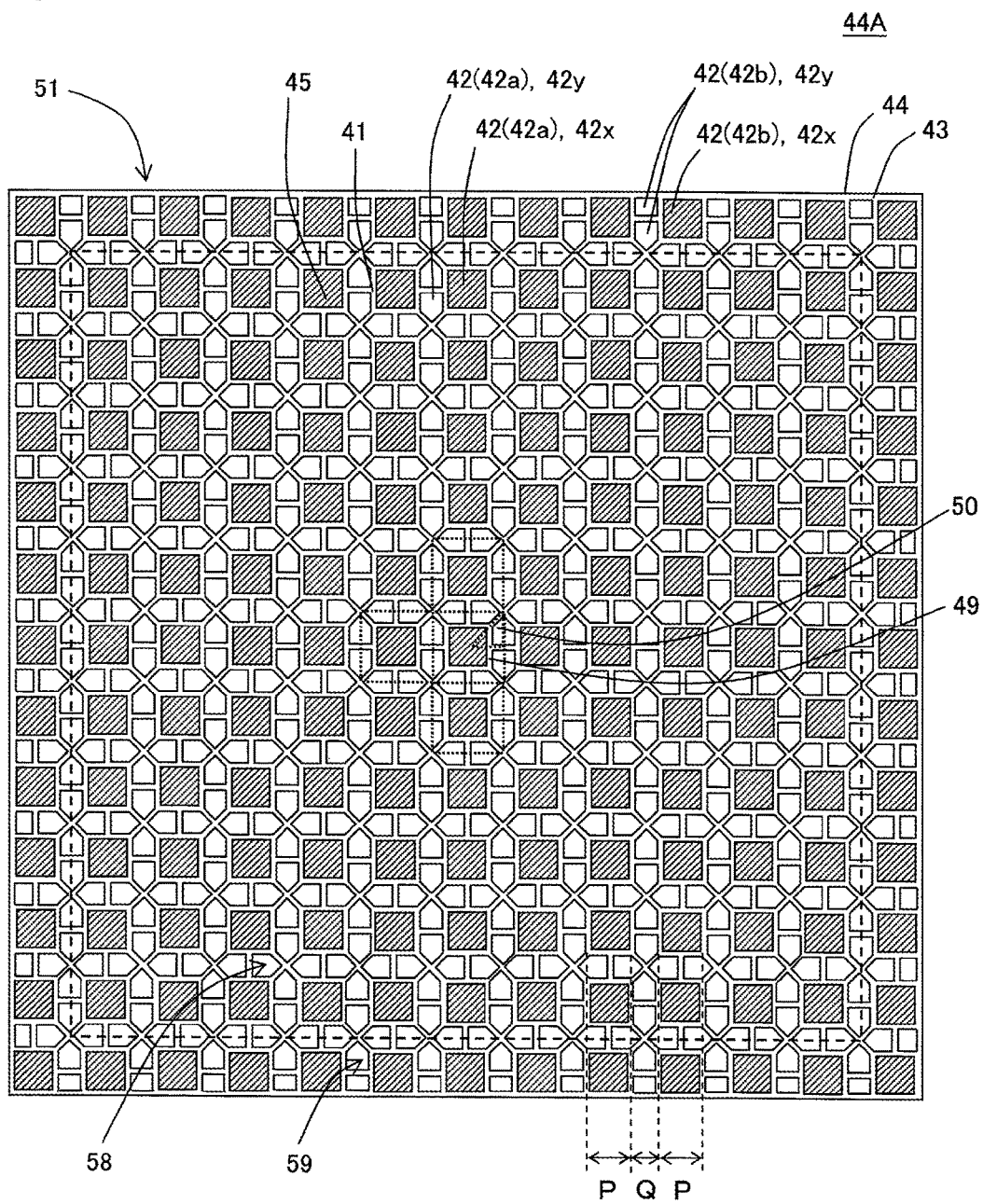
FIG. 11 is a schematic plan view showing a plugged honeycomb segment included in the third embodiment of a plugged honeycomb structure according to the present invention when viewed from the inflow-side end face.
Figure 12:
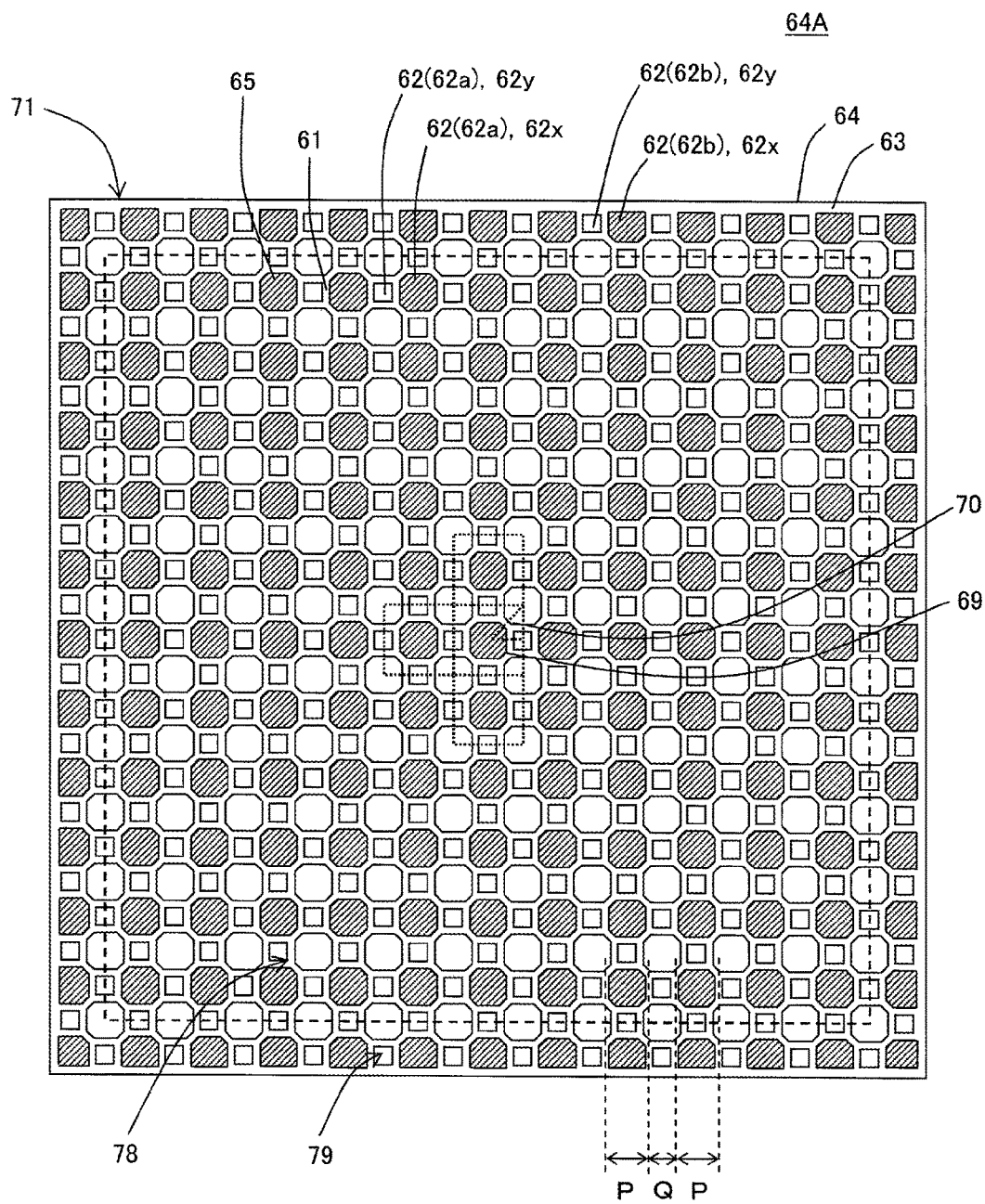
FIG. 12 is a schematic plan view showing a plugged honeycomb segment included in the fourth embodiment of a plugged honeycomb structure according to the present invention when viewed from the inflow-side end face.
Figure 13:
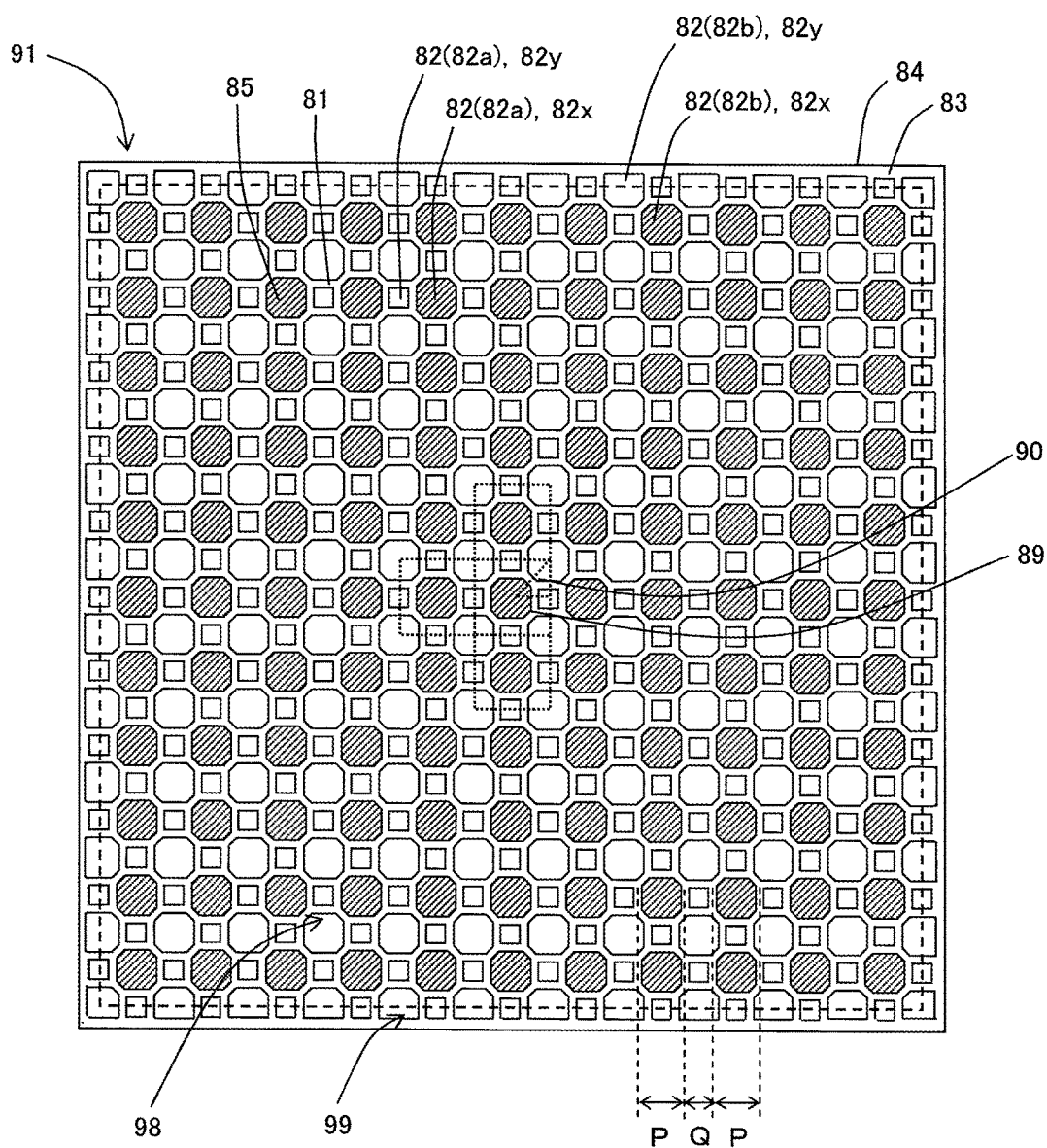
FIG. 13 is a schematic plan view showing a plugged honeycomb segment included in the fifth embodiment of a plugged honeycomb structure according to the present invention when viewed from the inflow-side end face.
Figure 14:
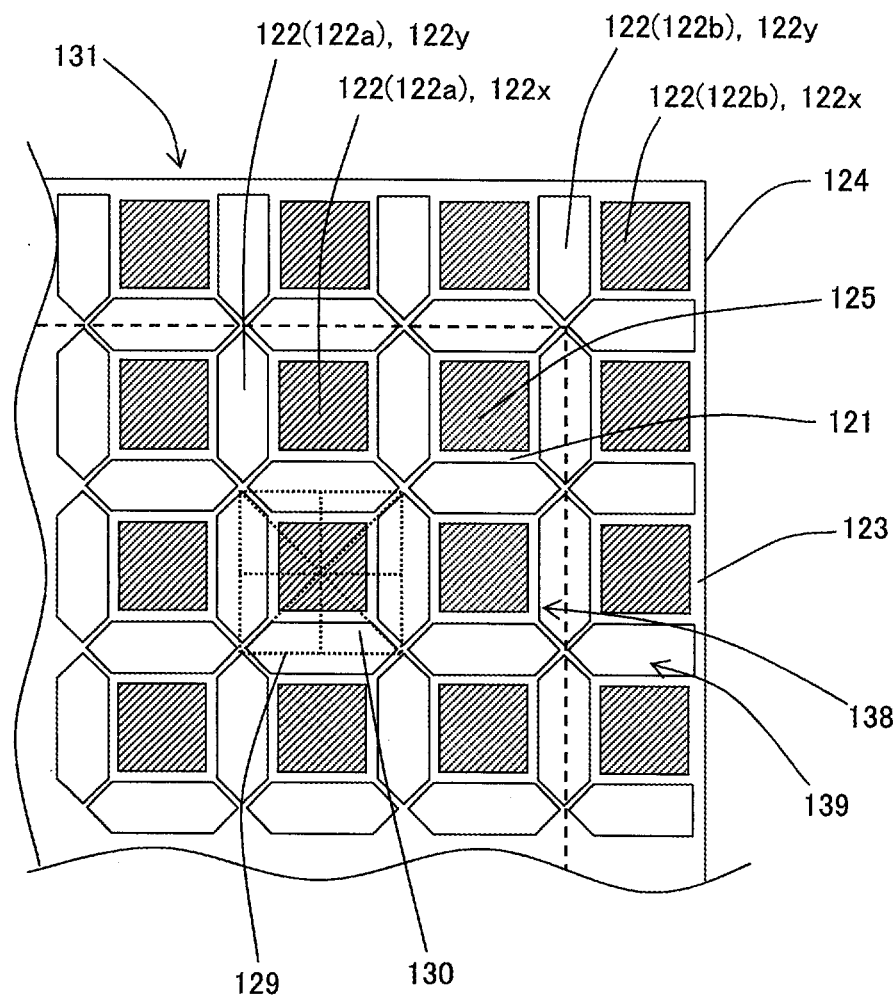
FIG. 14 is a schematic partially enlarged plan view showing a plugged honeycomb segment included in the sixth embodiment of a plugged honeycomb structure according to the present invention when viewed from the inflow-side end face.

The following describes other embodiments (the second embodiment to the sixth embodiment) of the plugged honeycomb structure of the present invention. The plugged honeycomb structures of the second embodiment to the sixth embodiment are preferably configured similarly to the first embodiment other than that the plugged honeycomb segments thereof are different from the plugged honeycomb segments included in the plugged honeycomb structure of the first embodiment. FIG. 10 is a schematic plan view showing the plugged honeycomb segment included in the plugged honeycomb structure that is the second embodiment of the present invention when viewed from the inflow-side end face. FIG. 11 is a schematic plan view showing the plugged honeycomb segment included in the plugged honeycomb structure that is the third embodiment of the present invention when viewed from the inflow-side end face. FIG. 12 is a schematic plan view showing the plugged honeycomb segment included in the plugged honeycomb structure that is the fourth embodiment of the present invention when viewed from the inflow-side end face. FIG. 13 is a schematic plan view showing the plugged honeycomb segment included in the plugged honeycomb structure that is the fifth embodiment of the present invention when viewed from the inflow-side end face. FIG. 14 is a schematic plan view showing the plugged honeycomb segment included in the plugged honeycomb structure that is the sixth embodiment of the present invention when viewed from the inflow-side end face.

The plugged honeycomb structure of the second embodiment includes a plugged honeycomb segment 24A as shown in FIG. 10. The honeycomb segment 24 includes porous partition walls 21 that define a plurality of cells 22, and a segment circumferential wall 23 disposed at the outermost circumference. Plugging portions 25 are disposed in the open ends of outflow cells 22x and in open ends of inflow cells 22y of the honeycomb segment 24. In FIG. 10, a reference numeral 22a denotes a center region cell, and a reference numeral 22b denotes a circumferential region cell.

The honeycomb segment 24 has a center region 38 including a center of the cross section orthogonal to the extension direction of the cells 22 and a circumferential region 39 located in the side of the circumference of the center region 38. In FIG. 10, the inside region surrounded by the dotted line (i.e., the region indicated by a reference numeral 38) is the center region 38 of the honeycomb segment 24. Then the outer region outside of the region surrounded by the dotted line (i.e., the region indicated by a reference numeral 39) is the circumferential region 39 of the honeycomb segment 24. The honeycomb segment 24 has a repeated pattern 29 including the cell arrangement in which inflow cells 22y surround one outflow cell 22x in the inflow end face 31. The range configured by repeating units 30 to maintain this repeated pattern 29 is the center region 38 as described above. In the honeycomb segment 24 shown in FIG. 10, the plugging portions 25 are disposed so that inflow cells 22y that the shape of the cells 22 is a pentagonal shape surround one outflow cell 22x that the shape of the cell 22 is a quadrangular shape. In the inflow end face 31 of the honeycomb segment 24, the circumferential region 39 is configured to have an open frontal area that is larger than an open frontal area of the center region 38.

The plugged honeycomb segment 24A is configured so that a thickness of the segment circumferential wall 23 of the honeycomb segments 24 is from 0.3 to 1.0 mm. Then, in the plugged honeycomb structure including this plugged honeycomb segment 24A, a thickness of the bonding layer 6 is from 0.5 to 1.5 mm.

The plugged honeycomb structure of the third embodiment includes a plugged honeycomb segment 44A as shown in FIG. 11. The honeycomb segment 44 includes porous partition walls 41 that define a plurality of cells 42, and a segment circumferential wall 43 disposed at the outermost circumference. Plugging portions 45 are disposed in the open ends of outflow cells 42x and in open ends of inflow cells 42y of the honeycomb segment 44. In FIG. 11, a reference numeral 42a denotes a center region cell, and a reference numeral 42b denotes a circumferential region cell.

The honeycomb segment 44 has a center region 58 including a center of the cross section orthogonal to the extension direction of the cells 42 and a circumferential region 59 located in the side of the circumference of the center region 58. In FIG. 11, the inside region surrounded by the dotted line (i.e., the region indicated by a reference numeral 58) is the center region 58 of the honeycomb segment 44. Then the outer region outside of the region surrounded by the dotted line (i.e., the region indicated by a reference numeral 59) is the circumferential region 59 of the honeycomb segment 44. The honeycomb segment 44 has a repeated pattern 49 including the cell arrangement in which inflow cells 42y surround one outflow cell 42x in the inflow end face 51. The range configured by repeating units 50 to maintain this repeated pattern 49 is the center region 58 as described above. In the honeycomb segment 44 shown in FIG. 11, the plugging portions 45 are disposed so that inflow cells 42y that a shape of the cells 42 is a pentagonal shape surround one outflow cell 42x that a shape of the cell 42 is a quadrangular shape. That is, the plugged honeycomb segment 44A shown in FIG. 11 has the "repeated pattern 49" including the cell arrangement configured by the outflow cell 42x whose cross-sectional shape is a quadrangular shape and the inflow cells 42y whose cross-sectional shape is a pentagonal shape.

In the plugged honeycomb segment 44A shown in FIG. 11 as well, in the inflow end face 51 of the honeycomb segment 44, the circumferential region 59 is configured to have an open frontal area that is larger than an open frontal area of the center region 58.

The plugged honeycomb structure of the fourth embodiment includes a plugged honeycomb segment 64A as shown in FIG. 12. The honeycomb segment 64 includes porous partition walls 61 that define a plurality of cells 62, and a segment circumferential wall 63 disposed at the outermost circumference. Plugging portions 65 are disposed in the open ends of outflow cells 62x and in the open ends of inflow cells 62y of the honeycomb segment 64. In FIG. 12, a reference numeral 62a denotes a center region cell, and a reference numeral 62b denotes a circumferential region cell.

The honeycomb segment 64 has a center region 78 including a center of the cross section orthogonal to the extension direction of the cells 62 and a circumferential region 79 located in the side of the circumference of the center region 78. In FIG. 12, the inside region surrounded by the dotted line (i.e., the region indicated by a reference numeral 78) is the center region 78 of the honeycomb segment 64. Then the outer region outside of the region surrounded by the dotted line (i.e., the region indicated by a reference numeral 79) is the circumferential region 79 of the honeycomb segment 64. The honeycomb segment 64 has a repeated pattern 69 including the cell arrangement in which inflow cells 62y surround one outflow cell 62x in the inflow end face 71. The range configured by repeating units 70 to maintain this repeated pattern 69 is the center region 78 as described above. The plugged honeycomb segment 64A shown in FIG. 12 has the "repeated pattern 69" including the cell arrangement configured by the outflow cell 62x whose cross-sectional shape is an octagonal shape and the inflow cells 62y whose cross-sectional shape is a quadrangular shape and an octagonal shape.

In the plugged honeycomb segment 64A shown in FIG. 12 as well, in the inflow end face 71 of the honeycomb segment 64, the circumferential region 79 is configured to have an open frontal area that is larger than an open frontal area of the center region 78.

The plugged honeycomb structure of the fifth embodiment includes a plugged honeycomb segment 84A as shown in FIG. 13. The honeycomb segment 84 includes porous partition walls 81 that define a plurality of cells 82, and a segment circumferential wall 83 disposed at the outermost circumference. Plugging portions 85 are disposed in the open ends of outflow cells 82x and in open ends of inflow cells 82y of the honeycomb segment 84. In FIG. 13, a reference numeral 82*a* denotes a center region cell, and a reference numeral 82*b* denotes a circumferential region cell.

The honeycomb segment 84 has a center region 98 including a center of the cross section orthogonal to the extension direction of the cells 82 and a circumferential region 99 located in the side of the circumference of the center region 98. In FIG. 13, the inside region surrounded by the dotted line (i.e., the region indicated by a reference numeral 98) is the center region 98 of the honeycomb segment 84. Then the outer region outside of the region surrounded by the dotted line (i.e., the region indicated by a reference numeral 99) is the circumferential region 99 of the honeycomb segment 84. The honeycomb segment 84 has a repeated pattern 89 including the cell arrangement in which inflow cells 82*y* surround one outflow cell 82*x* in the inflow end face 91. The range configured by repeating units 90 to maintain this repeated pattern 89 is the center region 98 as described above. The plugged honeycomb segment 84A shown in FIG. 13 has the "repeated pattern 89" including the cell arrangement configured by the outflow cell 82*x* whose cross-sectional shape is an octagonal shape and the inflow cells 82*y* whose cross-sectional shape is a quadrangular shape and an octagonal shape.

In the plugged honeycomb segment 84A shown in FIG. 13 as well, in the inflow end face 91 of the honeycomb segment 84, the circumferential region 99 is configured to have an open frontal area that is larger than an open frontal area of the center region 98.

The plugged honeycomb structure of the sixth embodiment includes a plugged honeycomb segment 124A as shown in FIG. 14. The honeycomb segment 124 includes porous partition walls 121 that define a plurality of cells 122, and a segment circumferential wall 123 disposed at the outermost circumference. Plugging portions 125 are disposed in the open ends of outflow cells 122*x* and in the open ends of inflow cells 122*y* of the honeycomb segment 124. In FIG. 14, a reference numeral 122*a* denotes a center region cell, and a reference numeral 122*b* denotes a circumferential region cell.

The honeycomb segment 124 has a center region 138 including a center of the cross section orthogonal to the extension direction of the cells 122 and a circumferential region 139 located in the side of the circumference of the center region 138. In FIG. 14, the inside region surrounded by the dotted line (i.e., the region indicated by a reference numeral 138) is the center region 138 of the honeycomb segment 124. Then the outer region outside of the region surrounded by the dotted line (i.e., the region indicated by a reference numeral 139) is the circumferential region 139 of the honeycomb segment 124. The honeycomb segment 124 has a repeated pattern 129 including the cell arrangement in which inflow cells 122*y* surround one outflow cell 122*x* in the inflow end face 131. The range configured by repeating units 130 to maintain this repeated pattern 129 is the center region 138 as described above. In the honeycomb segment 124 shown in FIG. 14, the plugging portions 125 are disposed so that inflow cells 122*y* that a shape of the cells 122 is a hexagonal shape surround one outflow cell 122*x* that a shape of the cell 122 is a quadrangular shape. That is, the plugged honeycomb segment 124A shown in FIG. 14 has the "repeated pattern 129" including the cell arrangement configured by the outflow cell 122*x* whose cross-sectional shape is a quadrangular shape and the inflow cells 122*y* whose cross-sectional shape is a hexagonal shape.

In the plugged honeycomb segment 124A shown in FIG. 14 as well, in the inflow end face 131 of the honeycomb segment 124, the circumferential region 139 is configured to have an open frontal area that is larger than an open frontal area of the center region 138.

Furthermore, the plugged honeycomb segments in the first to the sixth embodiments are configured so that the overall cell arrangement defined by the partition walls is axisymmetric in a cross section orthogonal to the axial direction of the plugged honeycomb segment. Although not illustrated, the plugged honeycomb segment may be configured so that the overall arrangement of the cells defined by the partition walls is not axisymmetric in a cross section orthogonal to the axial direction of the plugged honeycomb segment. In such a plugged honeycomb segment as well, it is configured so that the circumferential region is configured to have an open frontal area that is larger than an open frontal area of the center region in the inflow end face of the honeycomb segment, whereby advantageous effects in the same as those of the plugged honeycomb structure of the first embodiment can be obtained.

(2) Method for Manufacturing Plugged Honeycomb Structure:

There is no particular limitation on the method for manufacturing the plugged honeycomb structure of the present embodiment shown in FIGS. 1 through 5, and this can be manufactured by the following method, for example. Firstly a kneaded material having plasticity is prepared to manufacture a honeycomb segment. The kneaded material to manufacture a honeycomb segment can be prepared by appropriately adding additives such as a binder and water into a material selected as a raw material powder from the aforementioned materials suitable for honeycomb segment. As the raw material powder, for example, silicon carbide powder may be used. For example, the binder includes methylcellulose or hydroxypropoxylmethylcellulose. Moreover, the additives include a surfactant.

Next, the thus obtained kneaded material is extruded to prepare a prismatic columnar honeycomb formed body, having partition walls defining a plurality of cells and a segment circumferential wall disposed at the outermost circumference. A plurality of the honeycomb formed bodies is prepared.

The thus obtained honeycomb formed bodies are dried by microwaves and hot air, for example, and then open ends of the cells are plugged with the same material as the material used for the honeycomb formed bodies to prepare plugging portions. After the plugging portions are prepared, the honeycomb formed bodies may be further dried.

Next, each of the honeycomb formed bodies with the plugging portions is fired to obtain a plugged honeycomb segment. The firing temperature and the atmosphere for firing depend on the raw materials used, and a person skilled in the art could select an appropriate temperature and atmosphere for firing depending on the selected materials. Next, the plurality of plugged honeycomb segments are mutually bonded by using a bonding material. After the plurality of plugged honeycomb segments are dried and hardened, a circumference is processed to obtain a desirable shape, and then this can provide a plugged honeycomb structure having a segmented structure. The bonding material may include a material prepared by adding a solvent such as water into to a ceramics material to be in a paste form. Since the cells are exposed in the processed surface after the circumference of the plugged honeycomb segments is processed, a circumference coating material may be applied to the processed surface to form the outer wall as shown in FIG. 1. As the circumference coating material, the same material as that of the bonding material can be used.

(3) Plugged Honeycomb Segment:

Next, the following describes the first embodiment of the plugged honeycomb segment of the present invention. The plugged honeycomb segment of the present embodiment is used for the plugged honeycomb structure of the first embodiment as described above.

The plugged honeycomb segment of the present embodiment includes a honeycomb segment 4 and plugging portions 5 as shown in FIGS. 6 through 8. The honeycomb segment 4 includes porous partition walls 1 that define a plurality of cells 2 extending from an inflow end face 11 to which a fluid flows to an outflow end face 12 from which a fluid flows, and a segment circumferential wall 3 disposed at the outermost circumference. The plugging portions 5 are disposed in the open ends of the cells 2 formed in each of the honeycomb segments 4, and they plug either one of the open end on the side of the inflow end face 11 and on the side of the outflow end face 12. In the plugged honeycomb segment 4A of the present embodiment, a thickness of the segment circumferential wall 3 of the honeycomb segment 4 is from 0.3 to 1.0 mm.

The honeycomb segment 4 has a center region 18 including a center of the cross section orthogonal to the extension direction of the cells 2 and a circumferential region 19 located in the side of the circumference of the center region 18. In FIGS. 7 and 8, the inside region surrounded by the dotted line (i.e., the region indicated with a reference numeral 18) is the center region 18 of the honeycomb segment 4. Then the outer region outside of the region surrounded by the dotted line (i.e., the region indicated with a reference numeral 19) is the circumferential region 19 of the honeycomb segment 4. The honeycomb segment 4 has a repeated pattern 9 including cell arrangement in which inflow cells $2y$ surround one outflow cell $2x$ in the inflow end face 11. Then, the range including repeating units 10 to maintain this repeated pattern 9 is the center region 18 as described above. Then the circumferential region 19 is outside the center region 18, which does not have the repeating units 10 to maintain this repeated pattern 9. Herein, the circumferential region 19 may include the units of the same shape of that of the repeating units 10, which actually do not form a part of the repeated pattern 9, in the region.

The plugged honeycomb segment 4A of the present embodiment is configured so that in the inflow end face 11 of the honeycomb segment 4 the circumferential region 19 has open frontal area that is larger than open frontal area of the center region 18. The thus configured plugged honeycomb segment of the present embodiment can be preferably used as a honeycomb segment to prepare the plugged honeycomb structure of the first embodiment.

A suitable example of the plugged honeycomb segment of the present embodiment includes a plugged honeycomb segment used for the plugged honeycomb structure of the first embodiment.

Other suitable examples of the plugged honeycomb segment of the present invention include plugged honeycomb segments used for the plugged honeycomb structures according to the second to the sixth embodiments shown in FIGS. 10 through 14.

EXAMPLES

Example 1

As a ceramic raw material, silicon carbide (SiC) powder and metal silicon (Si) powder were mixed at the mass ratio of 80:20 to prepare a mixed raw material. Hydroxypropylmethylcellulose as a binder, a water absorbable resin as a pore former and further water were added to this mixed raw material to prepare a forming raw material. Then, the obtained forming raw material was kneaded by a kneader to prepare a kneaded material.

Next, the obtained kneaded material was formed by a vacuum extruder to prepare sixteen pieces of quadrangular prismatic-columnar honeycomb segments 4 having a repeated pattern 9 including the same cell arrangement as that of the plugged honeycomb segment 4A shown in FIG. 7. Herein, the "same cell arrangement as that of the plugged honeycomb segment 4A shown in FIG. 7" means the arrangement of cells such that eight inflow cells whose cross-sectional shape is a pentagonal shape surround an outflow cell whose cross-sectional shape is a square shape. Then, the repeated pattern 9 is the range including one outflow cell $2x$ and a half of each of eight inflow cells $2y$ as shown in FIG. 7.

Next, the obtained honeycomb segments were dried by high-frequency induction heating and then dried at 120° C. for 2 hours by a hot-air drier. The drying was performed so that the outflow end faces of the honeycomb segments were in a vertically downward direction.

Plugging portions were formed in each of the dried honeycomb segments. Firstly, the inflow end face of the honeycomb segment was masked, and next the masked end (end on the side of the inflow end face) was immersed in a plugging slurry, and the plugging slurry was charged into open ends of the cells which were not masked (outflow cells). In this way, plugging portions were formed on the side of the inflow end face of the honeycomb segment. Then, plugging portions were formed on the side of the outflow end face at the inflow cells of the dried honeycomb segment in the same manner as on the side of the inflow end face of the honeycomb segment.

Then the honeycomb segment including the plugging portions was degreased and fired to obtain a plugged honeycomb segment. The degreasing was performed at 550° C. for 3 hours, and the firing was performed at 1,450° C. in an argon atmosphere for 2 hours. The firing was performed so that the outflow end faces of the honeycomb segments including plugging portions were in a vertically downward direction.

The prepared plugged honeycomb segment had the circumferential region 19 including the triangular inflow cells $2y$ formed at the outermost circumference and a half of the pentagonal inflow cells $2y$ surrounding the quadrangular outflow cells $2x$ in the same as the plugged honeycomb segment 4A shown in FIG. 7. Then, the center region 18 was inside the circumferential region 19. The design of the plugged honeycomb segment in which the inflow cells and the outflow cells are configured as described above is called "design A". In the column of "design" of in table 1, the design of the plugged honeycomb segment used in Example 1 is shown.

In the prepared plugged honeycomb segment, a cross sectional shape orthogonal to the axial direction was square, and the length of one side of the square (segment size) was 37.1 mm. Furthermore, in the honeycomb segment, the length in the axial direction was 152.4 mm. Then in the plugged honeycomb segment, the distance P shown in FIG. 7 was 2.0 mm, the distance Q was 1.2 mm, and the thickness of the partition wall was 0.32 mm. Table 1 shows the values of "segment size (one side) [mm]", "thickness of partition wall [mm]", "distance P [mm]", and "distance Q [mm]".

In the prepared plugged honeycomb segment, the open frontal area of the center region in the inflow end face was 34%. In the prepared plugged honeycomb segment, the open frontal area of the circumferential region in the inflow end face was 65%. The value obtained by subtracting the value of the open frontal area in the center region from the value of the open frontal area in the circumferential region in the inflow end face was 31%. Table 1 shows the values of "open frontal area of center region in inflow end face", "open frontal area of circumferential region in inflow end face" and "difference of open-frontal area". Herein the "difference of open-frontal area" refers to a value obtained by subtracting the value of the open frontal area in the center region from the value of the open frontal area in the circumferential region in the inflow end face. In the prepared plugged honeycomb segment, a thickness of the segment circumferential wall was 0.5 mm. In the column of "segment circumferential wall thickness [mm]" in Table 1, the thickness of the segment circumferential wall is shown.

The sixteen pieces of plugged honeycomb segments were fired and integrally bonded with a bonding material (ceramic cement). The bonding material contained inorganic particles and an inorganic adhesive as main components and an organic binder, a surfactant, a foamable resin, water and the like as subcomponents. Plate-like particles were used as the inorganic particles, and a colloidal silica (silica sol) was used as the inorganic adhesive. Mica was used as the plate-like particles. The circumference of the honeycomb-segment bonded member including the sixteen pieces of honeycomb segments integrally bonded was ground to be a round pillar shape, and a coating material was applied to the circumferential face thereof to obtain the plugged honeycomb structure of Example 1. The diameter at the end face of the plugged honeycomb structure of Example 1 was 143.8 mm. The coating material contained a ceramic powder, water and a bonding material. The width of the bonding layer formed with the bonding material was 1 mm. In the column of "bonding width [mm]" in Table 1, the width of the bonding layer is shown.

TABLE 1

| | Design | Segment size (one side) [mm] | Thickness of partition wall [mm] | Distance P [mm] | Distance Q [mm] | Open frontal area of center region in inflow end face | Open frontal area of circumferential region in inflow end face | Difference of open frontal area | Bonding width [mm] | Thickness of segment circumferential wall [mm] |
|---|---|---|---|---|---|---|---|---|---|---|
| Comp. Ex. 1 | C | 39.4 | 0.32 | 2.0 | 1.2 | 34% | 34% | 0% | 1 | 0.5 |
| Ex. 1 | A | 37.1 | 0.32 | 2.0 | 1.2 | 34% | 65% | 31% | 1 | 0.5 |
| Ex. 2 | B | 38.2 | 0.32 | 2.0 | 1.2 | 34% | 44% | 10% | 1 | 0.5 |
| Ex. 3 | C | 39.3 | 0.32 | 2.0 | 1.2 | 34% | 35% | 1% | 1 | 0.5 |
| Comp. Ex. 2 | C | 39.5 | 0.32 | 2.0 | 1.2 | 34% | 32% | −2% | 1 | 0.5 |
| Ex. 4 | A | 37.1 | 0.32 | 2.0 | 1.2 | 34% | 65% | 31% | 1.5 | 0.5 |
| Comp. Ex. 3 | A | 37.1 | 0.32 | 2.0 | 1.2 | 34% | 65% | 31% | 1.6 | 0.5 |
| Ex. 5 | A | 37.1 | 0.32 | 2.0 | 1.2 | 34% | 65% | 31% | 0.5 | 0.5 |
| Comp. Ex. 4 | A | 37.1 | 0.32 | 2.0 | 1.2 | 34% | 65% | 31% | 0.4 | 0.5 |
| Ex. 6 | A | 38.1 | 0.32 | 2.0 | 1.2 | 34% | 65% | 31% | 1 | 1 |
| Comp. Ex. 5 | A | 38.3 | 0.32 | 2.0 | 1.2 | 34% | 65% | 31% | 1 | 1.1 |
| Ex. 7 | A | 36.7 | 0.32 | 2.0 | 1.2 | 34% | 65% | 31% | 1 | 0.3 |
| Comp. Ex. 6 | A | 36.5 | 0.32 | 2.0 | 1.2 | 34% | 65% | 31% | 1 | 0.2 |
| Ex. 8 | C | 39.3 | 0.32 | 2.0 | 1.2 | 34% | 35% | 1% | 1.5 | 0.5 |
| Comp. Ex. 7 | C | 39.3 | 0.32 | 2.0 | 1.2 | 34% | 35% | 1% | 1.6 | 0.5 |
| Ex. 9 | C | 39.3 | 0.32 | 2.0 | 1.2 | 34% | 35% | 1% | 0.5 | 0.5 |
| Comp. Ex. 8 | C | 39.3 | 0.32 | 2.0 | 1.2 | 34% | 35% | 1% | 0.4 | 0.5 |
| Ex. 10 | C | 40.3 | 0.32 | 2.0 | 1.2 | 34% | 35% | 1% | 1 | 1 |
| Comp. Ex. 9 | C | 40.5 | 0.32 | 2.0 | 1.2 | 34% | 35% | 1% | 1 | 1.1 |
| Ex. 11 | C | 38.9 | 0.32 | 2.0 | 1.2 | 34% | 35% | 1% | 1 | 0.3 |
| Comp. Ex. 10 | C | 38.7 | 0.32 | 2.0 | 1.2 | 34% | 35% | 1% | 1 | 0.2 |
| Comp. Ex. 11 | E | 38.4 | 0.31 | 1.7 | 1.4 | 45% | 45% | 0% | 1 | 0.5 |
| Ex. 12 | D | 36.2 | 0.31 | 1.7 | 1.4 | 45% | 81% | 36% | 1 | 0.5 |
| Ex. 13 | E | 36.9 | 0.31 | 1.7 | 1.4 | 45% | 55% | 10% | 1 | 0.5 |
| Ex. 14 | E | 38.1 | 0.31 | 1.7 | 1.4 | 45% | 46% | 1% | 1 | 0.5 |

Examples 2 to 14

The plugged honeycomb structures of Examples 2 to 14 were manufactured, in which the design, segment size, thickness of a partition wall, distance P, distance Q, open frontal area of a center region in inflow end face, open frontal area of a circumferential region in an inflow end face, bonding width, and segment circumferential wall thickness were changed as shown in Table 1. The ceramic raw material to prepare the plugged honeycomb segments was prepared in the same manner as in Example 1.

In Example 2, sixteen pieces of quadrangular prismatic-columnar honeycomb segments 24 having a repeated pattern 29 including the same cell arrangement as that of the plugged honeycomb segment 24A shown in FIG. 10 were prepared. The prepared plugged honeycomb segment included the two kinds of the quadrangular outflow cells 22x and the pentagonal inflow cells 22y at the outermost circumference in the same manner as in the plugged honeycomb segment 24A shown in FIG. 10. The plugged honeycomb segment prepared in Example 2 had the circumferential region 39 including the outflow cells 22x and the inflow cells 22y formed at the outermost circumference as well as a part of the pentagonal inflow cells 22y formed inwardly by one of the outflow cells 22x formed at the outermost circumference. Then, the center region 38 was inside the circumferential region 39. The design of the plugged honeycomb segment in which the inflow cells and the outflow cells are configured as described above is called "design B". In the column of "design" in Table 1, the design of the plugged honeycomb segment used for Example 2 is shown.

In Example 3, sixteen pieces of quadrangular prismatic-columnar honeycomb segments 44 having a repeated pattern 49 including the same cell arrangement as that of the plugged honeycomb segment 44A shown in FIG. 11 were prepared. The prepared plugged honeycomb segment included the quadrangular outflow cells 42x and the quadrangular inflow cells 42y at the outermost circumference in the same manner as in the plugged honeycomb segment 44A shown in FIG. 11. The plugged honeycomb segment prepared in Example 3 had the circumferential region 59 and the center region 58 configured as follows. The circumferential region 59 included the outflow cells 42x and the inflow cells 42y formed at the outermost circumference as well as the pentagonal inflow cells 42y formed on the outermost circumferential side and a part of the pentagonal inflow cells 42y formed inwardly by one of these outflow cells 42x. Then, the center region 58 was inside the circumferential region 59. The design of the plugged honeycomb segment in which the inflow cells and the outflow cells are configured as described above is called "design C". In the column of "design" in Table 1, the design of the plugged honeycomb segment used for Example 3 is shown.

In Example 12, sixteen pieces of quadrangular prismatic-columnar honeycomb segments 84 having a repeated pattern 89 including the same cell arrangement as that of the plugged honeycomb segment 84A shown in FIG. 13 were prepared. The prepared plugged honeycomb segment had the circumferential region 99 including a part of the inflow cells 82y and the outflow cells 82x formed at the outermost circumference in the same manner as in the plugged honeycomb segment 84A shown in FIG. 13. Then, the center region 98 was inside the circumferential region 99. The design of the plugged honeycomb segment in which the inflow cells and the outflow cells are configured as described above is called "design D". In the column of "design" in Table 1, the design of the plugged honeycomb segment used for Example 12 is shown.

In Example 13, sixteen pieces of quadrangular prismatic-columnar honeycomb segments 64 having a repeated pattern 69 including the same cell arrangement as that of the plugged honeycomb segment 64A shown in FIG. 12 were prepared. The prepared plugged honeycomb segment had the circumferential region 79 in the same manner as in the plugged honeycomb segment 64A shown in FIG. 12. That is, the circumferential region 79 included the inflow cells 62y and the outflow cells 62x formed at the outermost circumference as well as a part of the inflow cells 62y formed inwardly by one of these inflow cells 62y formed at the outermost circumference. Then, the center region 78 was inside the circumferential region 79. The design of the plugged honeycomb segment in which the inflow cells and the outflow cells are configured as described above is called "design E". In the column of "design" in Table 1, the design of the plugged honeycomb segment used for Example 13 is shown.

Comparative Examples 1 to 11

The plugged honeycomb structures of Comparative Examples 1 to 11 were manufactured, in which the design, segment size, thickness of a partition wall, distance P, distance Q, open frontal area of a center region at an inflow end face, open frontal area of a circumferential region at an inflow end face, bonding width, and segment circumferential wall thickness were changed as shown in Table 1. The ceramic raw material to prepare the plugged honeycomb segments was prepared in the same manner as in Example 1.

As to the plugged honeycomb structures of Examples 1 to 14 and Comparative Examples 1 to 11, evaluations of a regeneration efficiency, a pressure loss and an isostatic strength were carried out by methods described below. Table 2 shows the result of the evaluations.

TABLE 2

|  | Regeneration efficiency | Pressure loss | Isostatic strength |
|---|---|---|---|
| Comp. Ex. 1 | D | — | B |
| Ex. 1 | A | C | B |
| Ex. 2 | A | C | B |
| Ex. 3 | C | B | B |
| Comp. Ex. 2 | D | B | B |
| Ex. 4 | A | C | A |
| Comp. Ex. 3 | A | D | A |
| Ex. 5 | A | B | C |
| Comp. Ex. 4 | A | B | D |
| Ex. 6 | B | C | A |
| Comp. Ex. 5 | B | D | A |
| Ex. 7 | A | B | C |
| Comp. Ex. 6 | A | A | D |
| Ex. 8 | C | C | A |
| Comp. Ex. 7 | D | D | A |
| Ex. 9 | B | A | C |
| Comp. Ex. 8 | B | A | D |
| Ex. 10 | C | C | A |
| Comp. Ex. 9 | D | D | A |
| Ex. 11 | B | B | C |
| Comp. Ex. 10 | B | A | D |
| Comp. Ex. 11 | D | B | B |
| Ex. 12 | A | C | B |
| Ex. 13 | A | C | B |
| Ex. 14 | C | B | B |

(Regeneration Efficiency)

Firstly 20 g/L of platinum/palladium based catalyst for catalyzed soot filters (CSF) was loaded onto the plugged honeycomb structures of Examples 1 to 14 and Comparative Examples 1 to 11, and honeycomb filters with CSF catalyst were prepared. The CSF is the abbreviation of Catalyzed Soot Filter. Such a honeycomb filter with CSF catalyst was attached to an exhaust pipe of a diesel engine for an automobile of a displacement of 2.0 L, and a regeneration test was performed. The conditions of the regeneration test were as follows. Firstly, the diesel engine was operated under the conditions of the engine revolutions of 2,000 rpm and the engine torque of 60 Nm so as to let 6 g/L of soot accumulate on the plugged honeycomb structure. Next, the mass of the plugged honeycomb structure in which a soot was accumulated was measured. Next, the diesel engine was operated under the conditions of the engine revolutions of 2,000 rpm and the engine torque of 60 Nm, and when the temperature of an exhaust gas immediately before flowing into the plugged honeycomb structure became stable, then a post injection was performed, and a regeneration was performed for 10 minutes. Thereafter the mass of the plugged honeycomb structure after the regeneration was measured. Based on a difference in mass of the honeycomb filter with CSF catalyst between before and after the test, the amount of soot left in the honeycomb filter with CSF catalyst was obtained. A regeneration efficiency was evaluated based on the following evaluation criteria.

Evaluation A: the amount of soot left was less than 0.5 g/L.

Evaluation B: the amount of soot left was 0.5 g/L or more and less than 1.0 g/L.

Evaluation C: the amount of soot left was 1.0 g/L or more and less than 1.5 g/L.

Evaluation D: the amount of soot left was 1.5 g/L or more.

(Pressure Loss)

Firstly, the plugged honeycomb structure of Comparative Example 1 was attached to an exhaust system of an automobile which a diesel engine for automobile of a displacement of 2.0 L was mounted. Using this automobile, the pressure loss during full-load step-up was measured in the vehicle testing by a chassis dynamometer. Specifically, the engine revolutions were raised by 1,000 rpm for every 3 minutes/step to 5,000 rpm, and the pressure loss at each step was measured. The pressure loss of the plugged honeycomb structure of Comparative Example 1 was set as the reference for pressure loss evaluation. Next, the pressure loss of the plugged honeycomb structures of Examples 1 to 14 and Comparative Examples 2 to 11 was measured by a method in the same manner as in Comparative Example 1. The values of pressure loss of these Examples and Comparative Examples were compared with the value of pressure loss of Comparative Example 1 as the reference, and the pressure loss was evaluated based on the following evaluation criteria. Furthermore, the pressure loss at the engine revolutions of 5,000 rpm was used in the evaluation.

Evaluation A: the ratio to Comparative Example 1 as the reference was −5% or less.

Evaluation B: the ratio to Comparative Example 1 as the reference was +5% or less.

Evaluation C: the ratio to Comparative Example 1 as the reference was +15% or less.

Evaluation D: the ratio to Comparative Example 1 as the reference exceeded +15%.

(Isostatic Strength)

An isostatic strength was measured in accordance with the isostatic fracture strength testing specified at M505-87 of the Japanese Automotive Standards Organization (JASO) that is a specification issued by the Society of Automotive Engineers of Japan. An isostatic fracture strength is tested by placing a plugged honeycomb structure in a rubber-made tubular container, which is sealed with an aluminum plate, and applying an isostatic pressure thereto in water. That is, the isostatic fracture strength testing was performed by measuring the magnitude of a hydraulic pressure at which the honeycomb part of a plugged honeycomb structure fell into the hollow and was broken. An isostatic strength measured by this isostatic fracture strength testing is indicated as a pressure (MPa) applied when the plugged honeycomb structure breaks down. The isostatic strength was evaluated based on the following evaluation criteria.

Evaluation A: isostatic strength was 3.0 MPa or more.

Evaluation B: isostatic strength was 2.0 MPa or more and less than 3.0 MP.

Evaluation C: isostatic strength was 1.0 MPa or more and less than 2.0 MP.

Evaluation D: isostatic strength was less than 1.0 MP.

(Results)

In the plugged honeycomb structures of Examples 1 to 14, all evaluations of the regeneration efficiency, the pressure loss and the isostatic strength were Evaluation C or better. On the contrary, in all of the plugged honeycomb structures of Comparative Examples 1, 2, 7, 9 and 11, the evaluations of the regeneration efficiency were Evaluation D. In the plugged honeycomb structures that a thickness of the bonding layer was 1.6 mm in Comparative Examples 3 and 7, the evaluations of a pressure loss were Evaluation D. In the plugged honeycomb structures that a thickness of the bonding layer was 0.4 mm in Comparative Examples 4 and 8, the evaluations of the isostatic strength were Evaluation D. In the plugged honeycomb structures that a thickness of the segment circumferential wall was 1.1 mm in Comparative Examples 5 and 9, the evaluations of a pressure loss were Evaluation D. Furthermore, in the plugged honeycomb structures in Comparative Examples 7 and 9, the evaluations of the regeneration efficiency as well were Evaluation D. In the plugged honeycomb structures that a thickness of the segment circumferential wall was 0.2 mm in Comparative Examples 6 and 10, the evaluations of the isostatic strength were Evaluation D. Such results show that the plugged honeycomb structure of Examples 1 to 14 configured so that in the inflow end face of the honeycomb segment, the circumferential region has open frontal area that is larger than open frontal area in the center region were excellent in the regeneration efficiency. It was confirmed that the thickness of the segment circumferential wall of 0.3 to 1.0 mm and the thickness of the bonding layer of 0.5 to 1.5 mm allow a regeneration efficiency to be raised and as well as a good pressure loss and a good isostatic strength to obtain.

The plugged honeycomb structure of the present invention can be used as a trapping filter to remove particulates or the like included in an exhaust gas emitted from a direct injection type gasoline engine, a diesel engine and the like. The plugged honeycomb segment of the present invention can be used to manufacture the plugged honeycomb structure of the present invention.

DESCRIPTION OF REFERENCE NUMERALS 1, 21, 41, 61, 81, 121: partition wall
2, 22, 42, 62, 82, 122: cell
2a, 22a, 42a, 62a, 82a, 122a: center region cell
2b, 22b, 42b, 62b, 82b, 122b: circumferential region cell
2x, 22x, 42x, 62x, 82x, 122x: outflow cell (predetermined cell)
2y, 22y, 42y, 62y, 82y, 122y: inflow cell (residual cell)
3, 23, 43, 63, 83, 123: segment circumferential wall
4, 24, 44, 64, 84, 124: honeycomb segment
4A, 24A, 44A, 64A, 84A, 124A; plugged honeycomb segment
5, 25, 45, 65, 85, 125: plugging portion
6: bonding layer
7: honeycomb-segment bonded member
8: outer wall
9, 29, 49, 69, 89, 129: repeated pattern
10, 30, 50, 70, 90, 130: repeating unit
11, 31, 51, 71, 91, 131: inflow end face
12: outflow end face
13: first side
14: second side
15: third side 16: fourth side
18, 38, 58, 78, 98, 138: center region
19, 39, 59, 79, 99, 139: circumferential region
100: plugged honeycomb structure
P, Q: distance

What is claimed is:

1. A plugged honeycomb structure, comprising:
   a plurality of prismatic-columnar shaped honeycomb segments, each having porous partition walls that define a plurality of cells extending from an inflow end face to which a fluid flows to an outflow end face from which a fluid flows, and a segment circumferential wall disposed at an outermost circumference of each of the honeycomb segments;
   a bonding layer to bond the side surfaces of the plurality of honeycomb segments; and
   plugging portions disposed in open ends of predetermined cells in the inflow end face of each of the honeycomb segments and in open ends of residual cells in the outflow end face of each of the honeycomb segments, wherein
   each of the honeycomb segments is configured so that the cells having at least two kinds of different shapes are disposed in a cross section orthogonal to an extension direction of the cells,
   each of the honeycomb segments has a center region including a center of the cross section orthogonal to the extension direction of the cells and a circumferential region located on the side of the circumference of the center region,
   the center region of each of the honeycomb segments has a repeated pattern of repeating units including a cell arrangement in which inflow cells in which the plugging portions are disposed in open ends of the cells in the outflow end face surround one outflow cell in which the plugging portions are disposed in open ends of the cell in the inflow end face and the inflow cells are substantially the same size,
   in the inflow end face of at least one of the honeycomb segments, the circumferential region is configured to have an open frontal area that is larger than an open frontal area of the center region,
   a thickness of the segment circumferential wall of each of the honeycomb segments is from 0.3 to 1.0 mm, and
   a thickness of the bonding layer is from 0.5 to 1.5 mm.

2. The plugged honeycomb structure according to claim 1, wherein the repeated pattern includes the cells having at least two kinds of different shapes.

3. The plugged honeycomb structure according to claim 1, wherein center region cells disposed in the center region include two kinds or more of the cells that are different in shape of the cross section.

4. The plugged honeycomb structure according to claim 1, wherein a value obtained by subtracting a value of an open frontal area in the center region from a value of an open frontal area in the circumferential region is 10% or more.

5. A plugged honeycomb segment, comprising:
   a prismatic-columnar shaped honeycomb segment having porous partition walls that define a plurality of cells extending from an inflow end face to which a fluid flows to an outflow end face from which a fluid flows, and a segment circumferential wall disposed at an outermost circumference of each of the honeycomb segments; and
   plugging portions disposed in open ends of predetermined cells in the inflow end face of each of the honeycomb segments and in open ends of residual cells in the outflow end face of each of the honeycomb segments, wherein
   each of the honeycomb segments is configured so that the cells having at least two kinds of different shapes are disposed in a cross section orthogonal to an extension direction of the cells,
   each of the honeycomb segments has a center region including a center of the cross section orthogonal to the extension direction of the cells and a circumferential region located on the side of the circumference of the center region,
   in the center region each of the honeycomb segments has a repeated pattern of repeating units including a cell arrangement in which inflow cells in which the plugging portions are disposed in open ends of the cells in the outflow end face surround one outflow cell in which the plugging portions are disposed in open ends of the cell in the inflow end face and the inflow cells are substantially the same size,
   in the inflow end face of the honeycomb segment, the circumferential region is configured to have an open frontal area that is larger than an open frontal area of the center region, and
   a thickness of the segment circumferential wall of each of the honeycomb segments is from 0.3 to 1.0 mm.

6. The plugged honeycomb segment according to claim 5, wherein the repeated pattern includes the cells having at least two kinds of different shapes.

7. The plugged honeycomb segment according to claim 5, wherein central region cells disposed in the center region include two kinds or more of the cells that are different in shape of the cross section.

8. The plugged honeycomb segment according to claim 5, wherein a value obtained by subtracting a value of an open frontal area in the center region from a value of an open frontal area in the circumferential region is 10% or more.

* * * * *